(12) United States Patent
Endoh

(10) Patent No.: US 8,175,978 B2
(45) Date of Patent: May 8, 2012

(54) MANAGING THE ALLOWED USAGE AMOUNT OF A PROGRAM USING LICENSE INFORMATION

(75) Inventor: Tomoaki Endoh, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1391 days.

(21) Appl. No.: 10/527,909

(22) PCT Filed: Oct. 6, 2003

(86) PCT No.: PCT/JP03/12772
§ 371 (c)(1),
(2), (4) Date: Mar. 14, 2005

(87) PCT Pub. No.: WO2004/036409
PCT Pub. Date: Apr. 29, 2004

(65) Prior Publication Data
US 2006/0026105 A1    Feb. 2, 2006

(30) Foreign Application Priority Data
Oct. 15, 2002   (JP) ................................ 2002-300409

(51) Int. Cl.
*G06F 21/00* (2006.01)
(52) U.S. Cl. ............... 705/59; 705/50; 705/51; 705/57; 705/901; 705/902; 705/904; 705/911; 726/3; 726/4; 726/17
(58) Field of Classification Search ................ 705/59
See application file for complete search history.

(56) References Cited

U.S. PATENT DOCUMENTS
5,260,999 A * 11/1993 Wyman ........................... 705/59
5,629,980 A * 5/1997 Stefik et al. ..................... 705/54
(Continued)

FOREIGN PATENT DOCUMENTS
JP          8-76994        3/1996
(Continued)

OTHER PUBLICATIONS

"Error Message—Another version is already installed—Can't Install", posting to the microsoft.public.office.setup Usenet group from Jan. 26, 2002.*

(Continued)

*Primary Examiner* — James A Reagan
(74) *Attorney, Agent, or Firm* — Fitzpatrick, Cella, Harper & Scinto

(57) ABSTRACT

A management method is disclosed for managing license information indicating an allowed amount of usage of a program executable on a peripheral device or a function provided by the peripheral device. The method includes the steps of acquiring, from the outside, license identification information for identifying license information, and license information indicating an amount of a change in right of usage of the program, managing license identification information corresponding to license information that has already been installed, determining whether license identification information corresponding to license information is included in license identification information managed in the management step, and performing operation such that if it is determined in the determination step that the license identification information corresponding to the license information is included in the license identification information managed in the management step, changing the value of the already installed right of usage of the program by an amount equal to a change in the right of usage of the program.

11 Claims, 38 Drawing Sheets

U.S. PATENT DOCUMENTS

| | | | |
|---|---|---|---|
| 5,758,068 A * | 5/1998 | Brandt et al. | 726/27 |
| 5,956,505 A * | 9/1999 | Manduley | 713/1 |
| 6,512,894 B2 * | 1/2003 | Takemoto et al. | 399/12 |
| 7,127,069 B2 * | 10/2006 | Nguyen | 380/278 |
| 7,222,104 B2 * | 5/2007 | Tadayon et al. | 705/54 |
| 7,236,958 B2 * | 6/2007 | Wong et al. | 705/59 |
| 2001/0034846 A1 * | 10/2001 | Beery | 713/201 |
| 2002/0007456 A1 * | 1/2002 | Peinado et al. | 713/164 |
| 2002/0051164 A1 | 5/2002 | Watanabe et al. | 358/1.13 |
| 2002/0100036 A1 * | 7/2002 | Moshir et al. | 717/173 |
| 2003/0028454 A1 * | 2/2003 | Ooho et al. | 705/32 |
| 2003/0088516 A1 * | 5/2003 | Remer et al. | 705/59 |
| 2003/0156719 A1 * | 8/2003 | Cronce | 380/256 |
| 2005/0060334 A1 * | 3/2005 | Kawamoto et al. | 707/102 |
| 2007/0107067 A1 * | 5/2007 | Fountian | 726/33 |

FOREIGN PATENT DOCUMENTS

| | | |
|---|---|---|
| JP | 2000-330784 | 11/2000 |
| JP | 2001-92779 | 4/2001 |
| JP | 2002-108475 | 4/2002 |
| JP | 2002-117157 | 4/2002 |
| JP | 2002-132370 | 5/2002 |
| JP | 2003-244354 | 8/2003 |
| KR | 20010092195 | 10/2001 |
| KR | 20020070689 | 9/2002 |

OTHER PUBLICATIONS

Internet Archive Wayback Machine's Archive of "Adobe InDesign 1.5", archived on Sep. 17, 2001, available at <http://web.archive.org/web/20010917235454/www.adobe.com/products/indesign/main.html>.*

"How do I prevent reinstallation of expired shareware?" Posting from alt.comp.shareware.programmer, thread started Aug. 1, 1997. Available at <http://groups.google.com/group/alt.comp.shareware.programmer/browse_thread/thread/be4023c9419fb5cf>.*

Search Report, dated Feb. 18, 2008, in EP 03 74 8722.

European Search Report dated Feb. 19, 2008 issued during prosecution of related European application No. 03748722.0.

* cited by examiner

FIG. 4

| COUNTER NUMBER | APPLICATION ID |
|---|---|
| 1 | 11 |
| 2 | 0xFFFFFFFF |
| 3 | 51 |
| 4 | 0xFFFFFFFF |
| ⋮ | ⋮ |
| N | 0xFFFFFFFF |

FIG. 7

| COUNTER NUMBER | FOR COPYING | FOR PRINTING | FOR SCANNING |
|---|---|---|---|
| 1 | 5 | 10 | 10 |
| 2 | 0 | 10 | 0 |
| 3 | 75 | 0 | 50 |
| ... | ... | ... | ... |
| N | 0 | 0 | 0 |
| TOTAL NUMBER COUNTER | 100 | 20 | 60 |

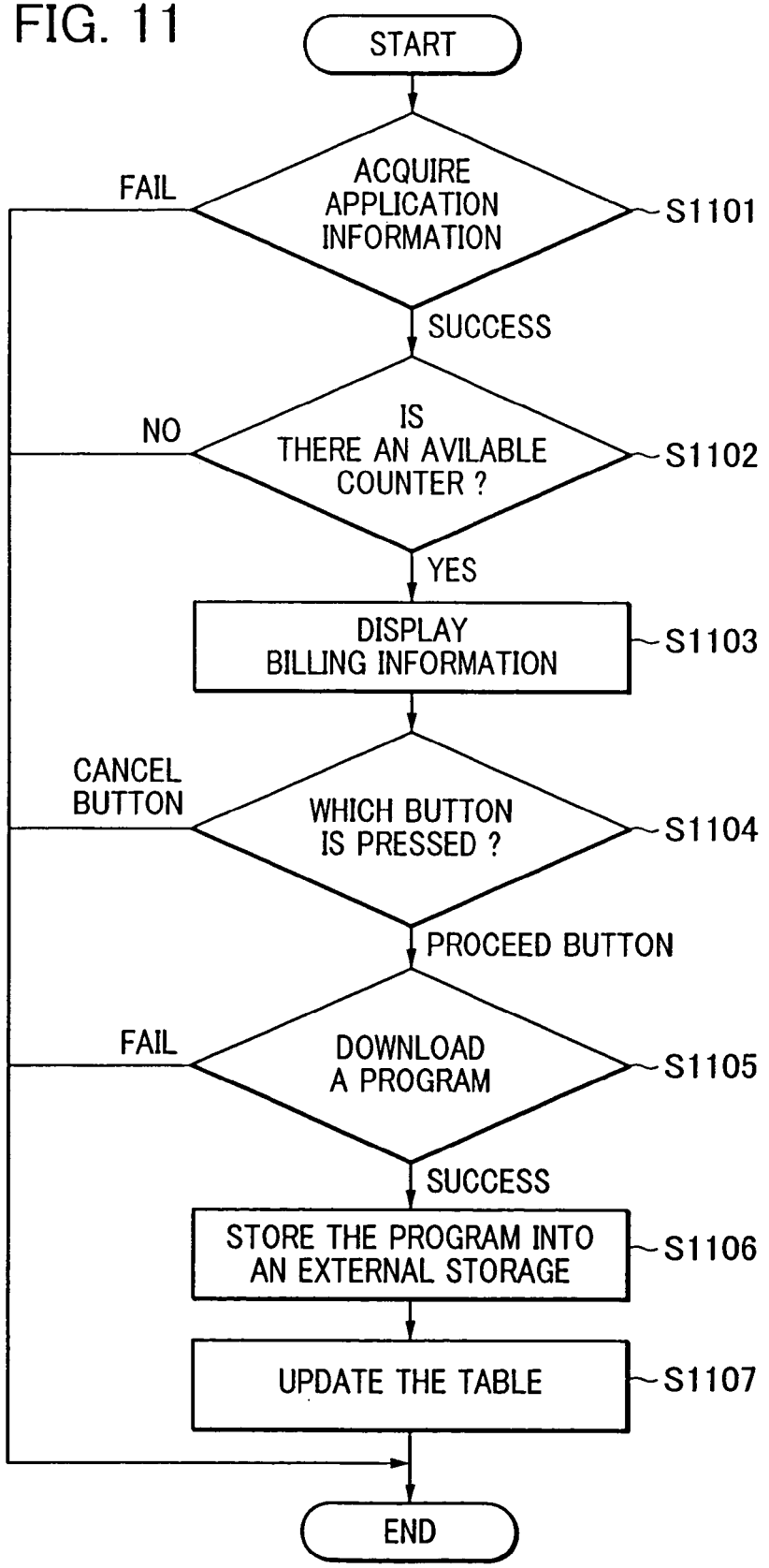

FIG. 12

| 1201 COPY COUNTERS ||
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

| 1202 SCAN COUNTERS ||
|---|---|
| COUNTER NUMBER | APPLICATION ID |
| 1 | 11 |
| 2 | 0xFFFFFFFF |
| 3 | 0xFFFFFFFF |
| ⋮ | ⋮ |
| N | 0xFFFFFFFF |

| 1203 PRINT COUNTERS ||
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

| 1204 COLOR COPY COUNTERS ||
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

| 1205 COLOR PRINT COUNTERS ||
|---|---|
| COUNTER NUMBER | APPLICATION ID |
| 1 | 0xFFFFFFFF |
| 2 | 0xFFFFFFFF |
| 3 | 0xFFFFFFFF |
| ⋮ | ⋮ |
| N | 0xFFFFFFFF |

| 1206 GENERAL-PURPOSE COUNTERS ||
|---|---|
| COUNTER NUMBER | APPLICATION ID |
| 1 | 11 |
| 2 | 0xFFFFFFFF |
| 3 | 0xFFFFFFFF |
| ⋮ | ⋮ |
| N | 0xFFFFFFFF |

FIG. 14

| VENDOR NAME | KAN-NON KABUSHIKI-KAISHA |
|---|---|
| APPLICATION ID | 11 |
| APPLICATION NAME | OCR SCAN C |
| VERSION | 1.0 |
| DATE OF LAST UPDATING | 2000/12/24 |
| NUMBER OF COUNTERS USED | 2 |
| COUNTER TYPE | GENERAL-PURPOSE COUNTER |
| COUNT-UP UNIT | 1 |
| COUNTER TYPE | SCAN COUNTER |
| COUNT-UP UNIT | 10 |
| MEMORY USED | 65535 |
| ARCHIVE FILE URL | http://hoge/ocr10.jar |

FIG. 16

| COUNTER NUMBER | FOR COPYING | FOR SCANNING | FOR PRINTING | FOR COLOR COPYING | FOR COLOR PRINTING | FOR GENERAL-PURPOSE COUNTER |
|---|---|---|---|---|---|---|
| 1 | 0 | 80 (a) | 0 | 0 | 0 | 4 (b) |
| 2 | 0 | 0 | 0 | 0 | 0 | 0 |
| 3 | 0 | 0 | 0 | 0 | 0 | 0 |
| ... | ... | ... | ... | ... | ... | ... |
| N | 0 | 0 | 0 | 0 | 0 | 0 |
| TOTAL NUMBER COUNTER (0) | 0 | 0 | 0 | 0 | 0 | 4 |

FIG. 19

| COUNTER NUMBER | FOR COPYING | FOR PRINTING | FOR SCANNING | |
|---|---|---|---|---|
| 1 | 1000 | 2000 | 1000 | (a) |
| 2 | 0 | 1000 | 0 | |
| 3 | 1500 | 0 | 300 | |
| ⋮ | ⋮ | ⋮ | ⋮ | (b) |
| N | 0 | 0 | 0 | |
| | (c) | (d) | (e) | |

FIG. 20

```
LicenseFileID=0x0123456789ABCDEF0123456789ABCDEF ;
DeviceSerialNo=ABC01234567, FTR76543210 ;
ExpirationDate=20021231 ;

ApplicationID=11 ;
ValidatedPeriod=60 ;
ApplicationKey=rtasdfhoqawertasdg ;
MaxCopy=1000 ;
AdditionalPrint=1000 ;
AdditionalScan=500 ;
```

FIG. 23

| LICENSE FILE ID | EXPIRATION DATE OF INSTALLATION |
|---|---|
| 0 × 01234583ABC | 20021231 |
| 0 × 123456789DD | 20030630 |
| 0 × 84374283EFF | 20040227 |
| ⋮ | ⋮ |
| 0 × 23425q43243A | 20020810 |

2301 — LICENSE FILE ID
2302 — EXPIRATION DATE OF INSTALLATION

FIG. 24

| APPLICATION ID | APPLICATION KEY | EXPIRATION DATE |
|---|---|---|
| 11 | rtasdfhoqawertasdg | 20021010 |
| 42 | ABCD | 20021231 |
| 63425 | 2qrgqerwerf | 20020908 |
| ⋮ | ⋮ | ⋮ |
| 34 | gasdfsa24gs | 20030227 |

2401 — APPLICATION ID
2402 — APPLICATION KEY
2403 — EXPIRATION DATE

FIG. 29

| DEVICE NAME | DEVICE ADDRESS | NUMBER OF SHEETS LICENSED TO BE FURTHER COPIED | NUMBER OF SHEETS LICENSED TO BE FURTHER PRINTED | NUMBER OF SHEETS LICENSED TO BE FURTHER SCANNED |
|---|---|---|---|---|
| MFP1 | 150.23.56.22 | 12452 | 23526 | 0 |
| MFP2 | 150.23.42.52 | 23 | 4235 | 0 |
| Printer1 | 150.23.53.21 | 654 | 34 | 0 |
| ... | ... | ... | ... | ... |
| Printer24 | 150.23.45.211 | 23 | 44 | 0 |

FIG. 34

| APPLICATION ID 3401 | USER NAME 3402 | EXPIRATION DATE 3403 | COPY 3405 | PRINT 3406 | SCAN 3407 | APPLICATION KEY 3408 |
|---|---|---|---|---|---|---|
| 11 | endoh,sakai | 20021231 | 1000 | 2000 | 3000 | rtasdfhoqawertasdg |
| 42 | endoh | 20030401 | 1000 | 1000 | 1000 | ABCD |
| 63425 | sakai | 20021010 | 2000 | 2000 | 2000 | 2qrgqerwerf |
| ... | ... | ... | ... | ... | ... | ... |
| 34 | adachi,endoh,sakai | 20020630 | 3000 | 3000 | 3000 | gasdfsa24gs |

FIG. 36

| LICENSE CERTIFICATE ID | LICENSE CERTIFICATE STATUS | APPLICATION ID | DAYS OF VALIDITY | COPY | PRINT | SCAN |
|---|---|---|---|---|---|---|
| 625634 | USED | 11 | 60 | 1000 | 2000 | 3000 |
| 453742 | USED | 42 | 30 | 1000 | 1000 | 1000 |
| 234267 | | 63425 | 90 | 2000 | 2000 | 2000 |
| ... | ... | ... | ... | ... | ... | ... |
| 27895 | | 34 | 30 | 3000 | 3000 | 3000 |

| APPLICATION ID 3801 | EXPIRATION DATE 3802 | MAXIMUM NUMBER OF USERS 3803 | CURRENT NUMBER OF USERS 3804 | COPY 3805 | PRINT 3806 | SCAN 3807 | APPLICATION KEY 3808 |
|---|---|---|---|---|---|---|---|
| 11 | 20021231 | 12 | 3 | 1000 | 2000 | 3000 | rtasdfhoqawertasdg |
| 42 | 20030401 | 3 | 2 | 1000 | 1000 | 1000 | ABCD |
| 63425 | 20021010 | 44 | 23 | 2000 | 2000 | 2000 | 2qrgqerwerf |
| ... | ... | ... | ... | ... | ... | ... | ... |
| 34 | 20020630 | 22 | 11 | 3000 | 3000 | 3000 | gasdfsa24gs |

MANAGING THE ALLOWED USAGE AMOUNT OF A PROGRAM USING LICENSE INFORMATION

TECHNICAL FIELD

The present invention relates to a peripheral device including a program installed thereon for controlling a process performed by the peripheral device, a method for the peripheral device, and a control program.

BACKGROUND ART

In the technology of an image forming apparatus, which is a typical example of a peripheral device, it is widely known to count the total outputs by using a hardware counter having a mechanical structure. To reduce the cost and the space necessary for installing a counter, a software counter has been proposed. The software counter technique allows a large number of counters to be implemented in a small space at low cost. In the software counter, count values are stored in a semiconductor memory. This makes it possible to prepare software counters for respective functions and store accurate count information for respective functions. (Japanese Patent Application Laid-Open No. 2001-92779). Hereinafter, the soft counter is referred to simply as a counter. In the present invention, the term "counter" is used to generically describe means for measuring and storing the amount of usage, such as the number of times that a program is executed, the number of times that an operation is performed, or the length of usage time of an application program, in a peripheral device such as a printer, a facsimile machine, a scanner, a copier, or a multifunction apparatus having two or more of the above functions.

A printing system is known in which charge for use is imposed depending on a combination of a particular function such as a printing function or a scanner function and an application that uses the particular function (Japanese Patent Application Laid-Open No. 2002-117157).

It is becoming easier to add and delete software to realize various kinds functions on a peripheral device. A printing apparatus has been proposed in which a counter is fixedly assigned to each application to count the number of times that each application is executed.

Provision of counters assigned to respective applications makes it possible to impose charge for use of applications depending on the amount of usage of each application. In this case, an owner of applications or an agent such as a service person has to periodically read the count values for respective applications and charge users for use of the applications on the basis of the count values. However, management of count values is troublesome, and reading the count values needs a high labor cost. The problem becomes serious in particular when there are a large number of applications. Even in a system in which counter values are automatically read via a network or the like, the system has to have high reliability, and it is required to collect information each time counting is performed, which causes a high load to be imposed on the network.

A possible technique of solving the above problems is to impose an upper limit on the amount of usage for each application and to give rights of usage of applications to users by issuing an electronic certificate authenticated by a particular certificate authority (CA) or by providing license information or license data to users whereby users are allowed to use applications within given rights.

However, anyone can produce license information by using a production tool, if the production tool is acquired.

DISCLOSURE OF INVENTION

In view of the above, it is an aspect of the present invention to provide a technique of allowing only an owner of a right of usage of applications or functions of a peripheral device to issue license information. Furthermore, in order to make it possible to transfer license information of an application from a device to another device when a failure occurs in the device or for any other reason, or in order to make it possible to return a right of usage of an application to an owner of the application because of termination of usage of the application after installing the right of usage on a device, it is an aspect of the present invention to provide a technique of taking back, from a device, license information that gives a right of usage of an application a particular number of times. It is another aspect of the present invention to provide a technique of taking back, from a device, license information indicating a right of usage of an application a particular number of times such that the taken-back license information cannot be installed in any device.

In order to achieve at least one of the aspects, the present invention provides a management apparatus for managing license information indicating an amount of allowed usage of a program executable on a peripheral device or a function of the peripheral device, comprising acquisition means for acquiring, from the outside, license identification information for identifying license information, and license information indicating an amount of a change in right of usage of the program, management means for managing license identification information corresponding to license information that has already been installed, determination means for determining whether license identification information corresponding to license information is included in license identification information managed by the management means, and operation control means for, if the determination means determines that the license identification information corresponding to the license information is included in the license identification information managed by the management means, changing the value of the already-installed right of usage of the program by an amount equal to a change in the right of usage managed by the management means.

In another aspect, the present invention provides an information processing apparatus having a capability of producing license information indicating an amount of allowed usage of a program executable on a peripheral device or a function of the peripheral device, comprising means for producing license identification information for identifying particular license information, and change means for changing license information such that program identification information identifying the program, the amount of allowed usage, and device identification information identifying a device are incorporated into the license information, and the license identification information produced by the generation means is incorporated into the license information. In another aspect, the present invention provides a peripheral device having a capability of managing the amount of usage of a program by using a counter, comprising acquisition means for acquiring the amount of allowed usage of a particular program on the peripheral device, means for producing license information on the basis of the amount of allowed usage acquired by the acquisition means, detection means for detecting a device to which to transfer the license information, and transfer means for transferring encrypted license information as license information to an external device.

Further aspects, features and advantages of the present invention will become apparent from the following description of the preferred embodiments with reference to the attached drawings.

BRIEF DESCRIPTION OF THE DRAWINGS

FIG. 4 is a diagram showing an example of a counter number/application ID table according to the first embodiment of the present invention.

FIG. 7 is a diagram showing an example of a set of counters provided in a multifunction apparatus according to the first embodiment of the present invention.

FIG. 11 is a flow chart showing a process performed in response to pressing of an OK button shown in FIG. 10, according to the second embodiment of the present invention.

FIG. 12 is a diagram showing an example of a counter number/application ID table according to the second embodiment of the present invention.

FIG. 14 is diagram showing an example of a set of elements of application information according to the second embodiment of the present invention.

FIG. 16 is a diagram showing an example of a set of counters provided in a multifunction apparatus according to the second embodiment of the present invention.

FIG. 19 is a diagram showing an example of a counter upper limit table.

FIG. 20 is a diagram showing an example of the content of a license file.

FIG. 23 is a diagram showing an example of a license file ID table.

FIG. 24 is a diagram showing an example of an application key table.

FIG. 29 is a diagram showing an example of a license usage status table.

FIG. 34 is a diagram showing an example of an application license database by which the number of users allowed to use applications is limited to a predetermined value.

FIG. 36 is a diagram showing an example of a license certificate database.

FIG. 38 is a diagram showing an example of an application license database according to an embodiment of the present invention.

BEST MODE FOR CARRYING OUT THE INVENTION

The present invention is described in further detail below with reference to preferred embodiments in conjunction with the accompanying drawings.

First Embodiment

Figure 1:
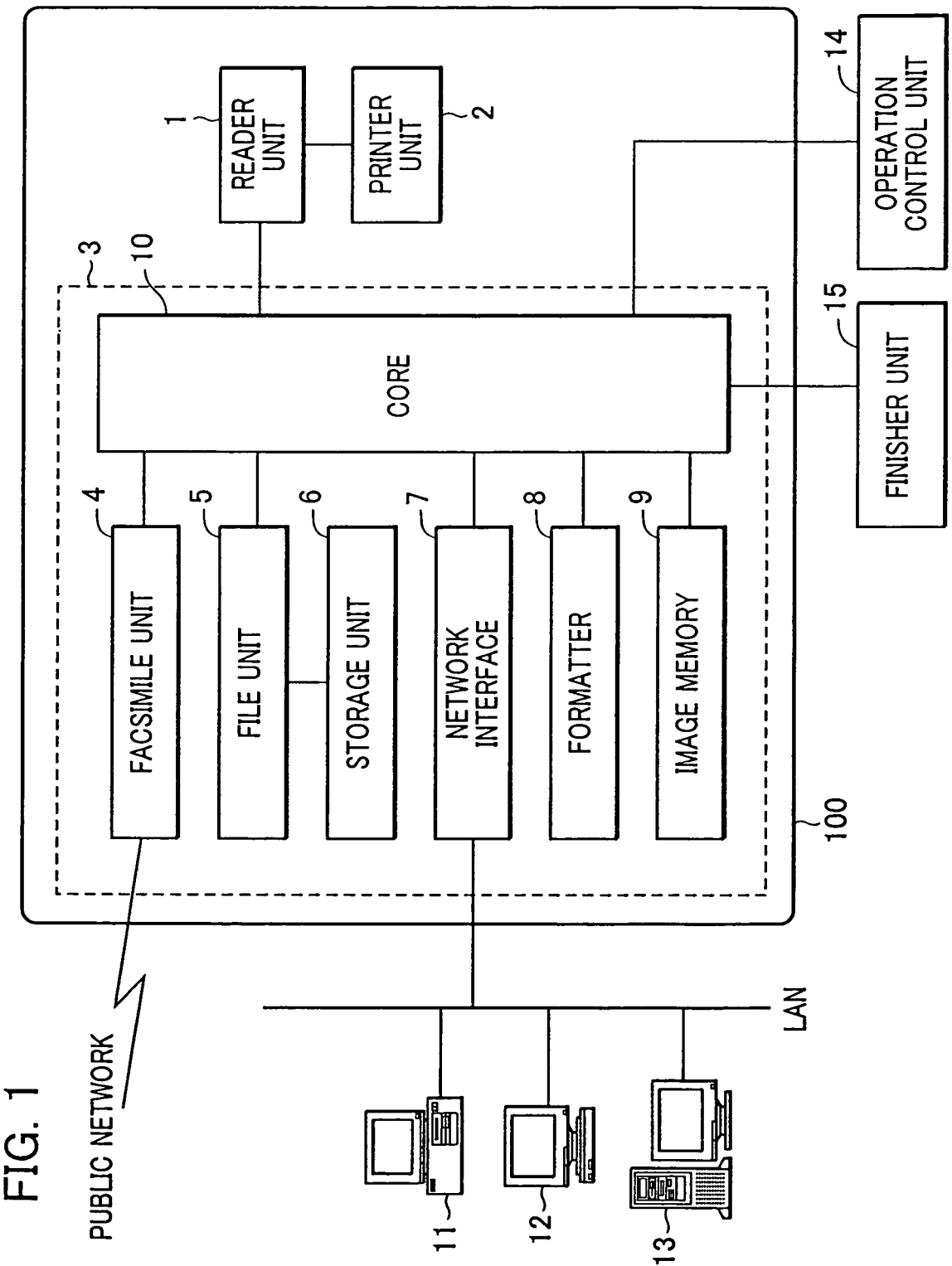
FIG. 1 is a diagram generally showing a system according to a first embodiment of the present invention.

FIG. 1 is a diagram generally showing a system according to a first embodiment of the present invention. In FIG. 1, a multifunction apparatus 100 is a typical example of a peripheral device and has factions of a scanner a printer, a copier, and a facsimile. The multifunction apparatus 100 is connected, via a network, to a network server 12 that is a preferred example of the external information processing apparatus and also to a host computer 11 that is a preferable example of the information processing apparatus. The multifunction apparatus 100 is also connected to other communication apparatus via a public communication network. The multifunction apparatus 100 is not limited to that shown in FIG. 1, but the multifunction apparatus 100 may be a digital copier or a printer capable of functioning also as a copier. The number of peripheral devices connected to the network is not limited to that in the example sown in FIG. 1. The peripheral device is not limited to the multifunction apparatus 100, but a single-function device having a capability of forming an image such as a facsimile machine, a printer, or a scanner or a controller disposed in such a device may also be used as the peripheral device. Counters may be provided on a network board such as a network interface of a printer.

The multifunction apparatus 100 mainly includes a reader 1, as printer unit 2, and an image input/output controller 3. The reader 1 is connected to the printer unit 2 and the image input/output controller 3. The reader 1 reads an image of a document and outputs resultant image data to the printer unit 2 or the image input/output controller 3. The printer unit 2 prints an image on printing paper in accordance with image data output from the reader 1 and the image input/output controller 3. The image input/output controller 3 is connected to an external network or a public communication network and is responsible for inputting/outputting image data. When a user uses the multifunction apparatus 100, the image input/output controller 3 stores data indicating the amount of usage of the multifunction apparatus 100. The image input/output controller 3 also analyzes and controls a job (such as a print command) received from the host computer 11 connected via the network.

The image input/output controller 3 includes a facsimile unit 4, a file unit 5, a network interface 7 that is an example of acquisition means, a PDL formatter 8, and a core 10. The facsimile unit 4 is connected to the core 10 and the public communication network. If the facsimile unit 4 receives compressed image data via the public communication network, the facsimile unit 4 decompresses the compressed image data and transmits the resultant decompressed image data to the core 10. On the other hand, if the facsimile unit 4 receives image data from the core 10, the facsimile unit 4 compresses the received image data and transmits the compressed image data to the public communication network via the public communication line. The file unit 5 is connected to the core 10 and a storage apparatus 6. The file unit 5 compresses image data received from the core 10 and stores in the storage apparatus 6 the resultant compressed image data together with a keyword for use in retrieving the compressed image data. In the present embodiment, a hard disk drive is used as the storage apparatus 6 that is a preferable example of the storage means, although the storage apparatus 6 is not limited to the hard disk drive. Furthermore, the file unit 5 retrieves compressed image data stored in the storage apparatus 6 in accordance with a keyword received from the core 10. The file unit 5 reads the retrieved compressed image data, decompresses it, and transmits the resultant decompressed image data to the core 10.

The network interface 7 serves as an interface between the core 10 and the host computer 11 and the network server 12 connected via the external network. Reception of job control data from the host computer 11 (host computer 3000) and transmission of image data or the like to the host computer 11 are performed via the network interface 7. For example, the job control data includes a job control command to be transmitted together with PDL data. For example, PDL data is converted into image data and printed on paper, and, thereafter, sheets of paper are sorted and stapled. The network interface 7 has a database called an MIB (Management Information Base) according to which the network interface 7 manages the printer unit 2 by communicating with the host computer 11 on the network via the SNMP (Simple Network Management Protocol). The network interface 7 has the capability of accepting an install request, an uninstall request, a start request, a stop request, etc., for installing, uninstalling, starting, or stopping an application that implements various functions on the image forming apparatus. This makes possible for other apparatuses connected via the network to control the application on the multifunction apparatus 100.

The formatter 8 is connected to the core 10, and is responsible for converting PDL data received from the host computer 11 into image data in a format that can be dealt with by the printer unit 2 to print an image.

An image memory 9 is used to temporarily store information received from the reader 1 or information received from the host computer 11 or the like via the network interface.

The core 10, which is a preferable example of a unit serving as the storage means and also as the analysis means, controls the data that is transmitted among the reader 1, the facsimile unit 4, the file unit 5, the network interface 7, and PDL (Page Description Language) formatter 8. The core 10 also analyzes job control data and stores information indicating the status associated with usage by users, the number of sheets to be copied, the number of sheets to be printed, or the number of sheets to be scanned.

The host computer 11 (information processing apparatus) is a personal computer or a work station (PC/WS). The network server 12 is responsible for controlling the entire network. An accounting server 13, which is an example of the external information processing apparatus, includes a server for managing accounting information associated with the multifunction apparatus 100. The accounting server 13 is capable of displaying the amount of usage of the multifunction apparatus 100 on the basis of the count values of the counters of the multifunction apparatus 100 and is capable of managing the amount of usage. The operation control unit 14 includes an operation control panel. Using a touch panel disposed on the operation control panel, a user can select an application to be executed and can select a function to be used by the application. Instead of inputting an application execution command via the operation control unit 13 of the multifunction apparatus 100, an application execution command can also be input from the network server 12 serving as the external information processing apparatus. The amount of usage of the application executed is counted by counters that will be described later after the description of the multifunction apparatus 100.

Figure 2:
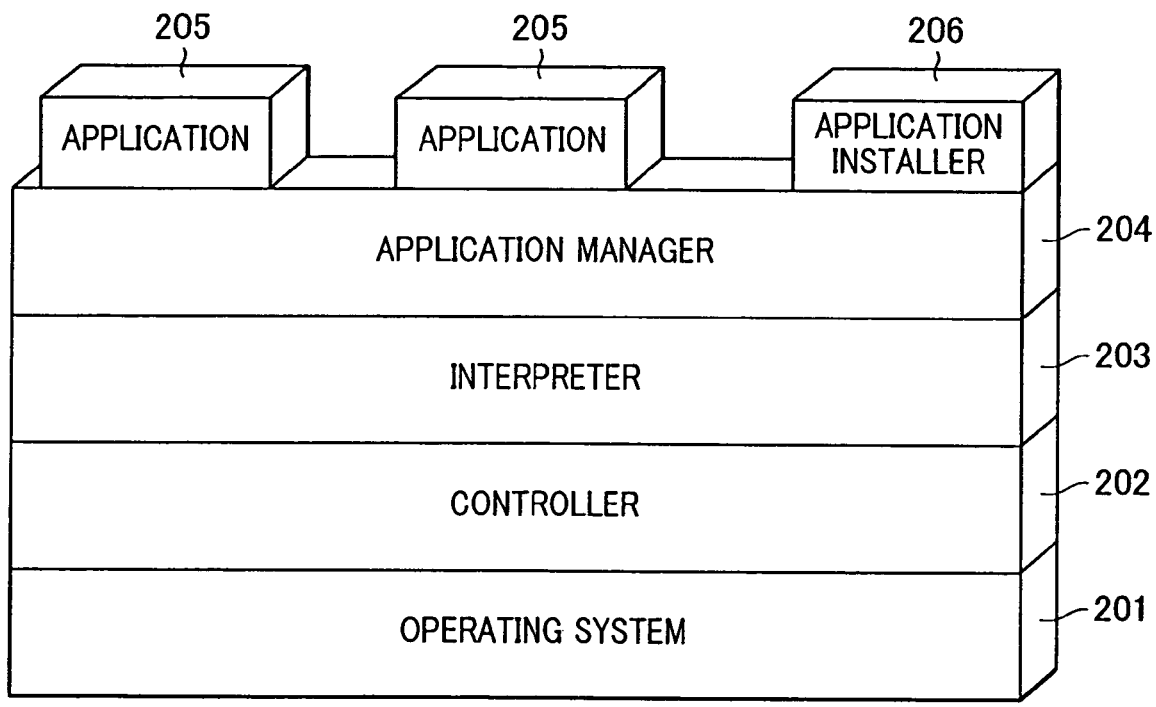
FIG. 2 is a diagram showing a preferred example of a hierarchical structure of software modules of a multifunction apparatus according to the first embodiment of the present invention.

FIG. 2 is a diagram showing a preferred example of software module hierarchy of the image forming apparatus according to the first embodiment of the present invention. The software module includes an operating system (OS) 201. In an upper layer above the operation system 201, the software module includes a controller module 202 for controlling various devices. In a further upper layer, the software module includes an interpreter module 203 for executing programs on a step-by-step basis. In an upper layer above the interpreter module 203, the software module includes an application management module 204 for managing applications that can be dynamically installed and removed. Applications 205 for implementing various functions operate under the control of the application management module 204. An application module for providing a copying function can be executed via the interpreter module 203. For example, in response to installing an application module acquired from the external server into the image forming apparatus, the application management module 204 adds an application 205 and manages it. On the other hand, if the application module is deleted from the image forming apparatus, the application management module 204 removes the application 205 from management.

An application installer 206 for installing/uninstalling the application 205 can also be executed on the application management module 204. Applications are typical examples of the programs for providing, in cooperation with the multifunction apparatus, various processes to users. Specific examples of applications include an application for processing or compressing an image, an application program for management, for example, of limitation on printing, a plug-in program embedded in an application, a program for remote-controlling a multifunction apparatus, an application for binding printed sheets by controlling a unit of multifunction apparatus such as a finisher, a program for converting or analyzing particular document data, a document production program such as a word processor, a schedule management program, a spreadsheet program, a database management program, and a server program for providing print service via the Internet.

Those software programs are executed on a CPU (not shown) in the core 10. In the embodiments described above, an interpreter and an OS (Operating System) are installed on the copier. The applications 205 are not limited to those described above, but other application modules may also be employed as long as they can operate on the image forming apparatus and they can be properly managed by the application management module 204.

Figure 3:
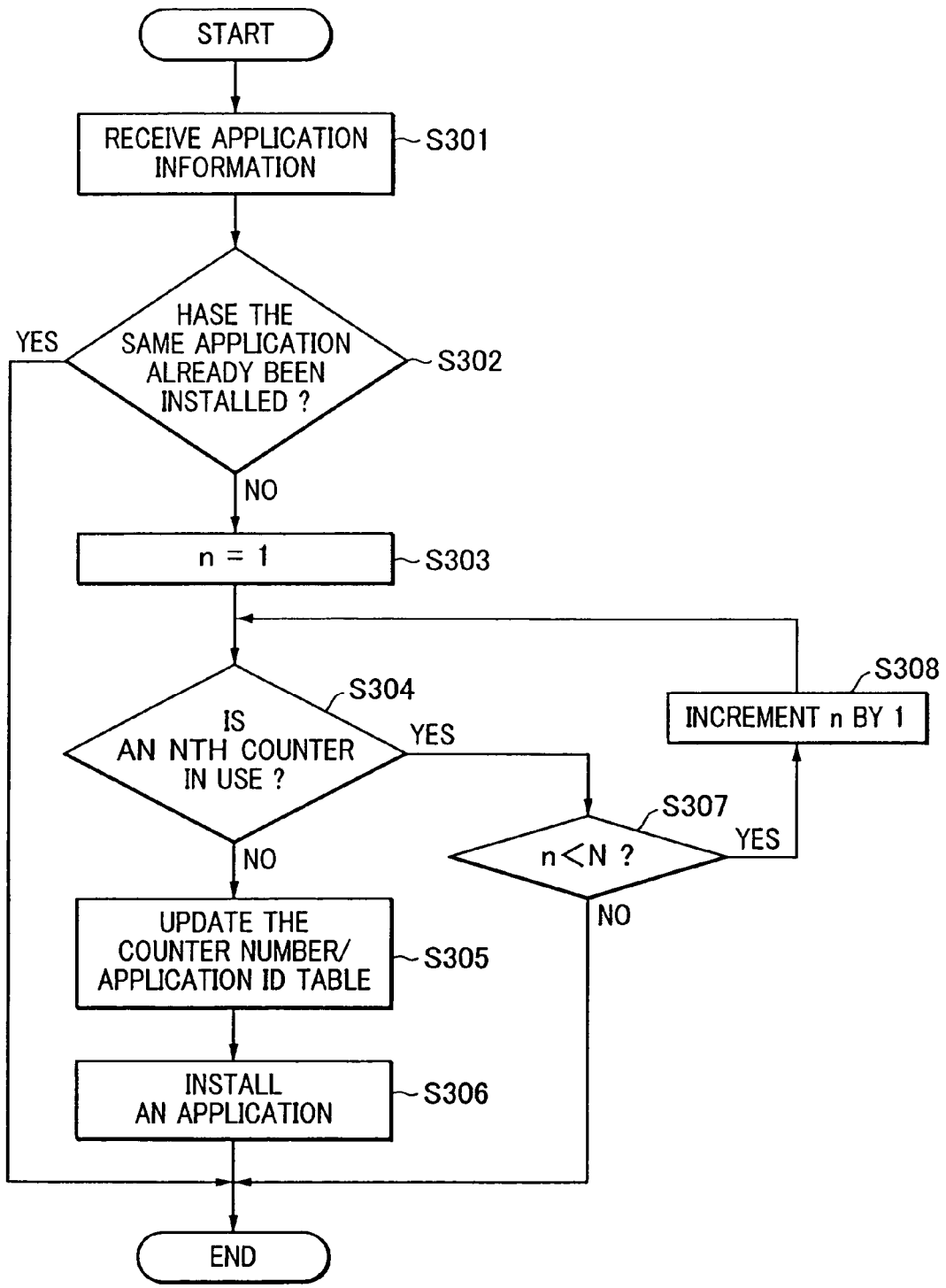
FIG. 3 is a flow chart showing a process of installing an application on a multifunction apparatus shown in FIG. 1, according to the first embodiment of the present invention.

FIG. 3 is a flow chart showing a process of installing an application on the multifunction apparatus 100 (multifunction apparatus 2702). Referring to FIG. 3, a process performed by the application installer 206 to install a new application on the multifunction apparatus 100 from the host computer 11 is described below. On an operation control screen of the host computer 11, if an application install command is input using a pointing device (not shown) that is a preferred example of command input means, the process shown in FIG. 3 is started. First, in step S301, application information is received from the host computer 11. The application information includes attribute information associated with the program, such as a vendor name, an application ID, an application name, a required memory size, a version number, and a last update date/time. The application information is used in management of the usage of the application.

If the application information including the application ID, which is a typical example of the attribute information associated with the program, is received in step S301, then the application installer 206 performs step S302. In step S302, the application installer 206 determines whether the same application has already been installed. More specifically, the application installer 206 determines whether the same application has already been installed, by comparing the application information acquired in step S301 with the application information associated with an application that has already been installed. If the application installer 206 determines in step S302 that the same application exists, the application installer 206 terminates the process. However, if it is determined that the same application does not exist, the application installer 206 advances the process to step S303. In step S303, the application installer 206, serving as determination means, substitutes 0 into variable n. Thereafter, the application installer 206 advances the process to step S304. In step S304, the application installer 206 determines whether an nth application counter is being used. If it is not being used, the application installer 206 advances the process to step S305. In step S305, the application installer 206 updates a counter number/application ID table. More specifically, the counter number n and the application ID are written in relation to each other in the table. In the present description, the "counter" refers to a counter for counting the number of times the application has been used, wherein the number of times is a typical example of the amount of usage of the application. The counter includes measurement/storage means for counting the length of time needed to start up the application and storing the counted value.

FIG. 4 shows an example of the counter number/application ID table. In this example shown in FIG. 4, a counter assigned counter number 1 corresponds to an application assigned application ID 11. A counter assigned counter number 3 corresponds to an application assigned application ID 51. The other counters are unused. After the completion of updating the table in step S305, the application installer 206 advances the process to step S306. In step S306, the application installer 206 downloads the application program from the host into the storage apparatus 6 of the multifunction apparatus 100 such that the application can be used on the multifunction apparatus 100. Thereafter, the application installer 206 ends the process. On the other hand, if the application installer 206 determines in step S304 that the nth counter is being used, the application installer 206 advances the process to step S307. In step S307, the application installer 206 increments the variable n by 1 and advances the process to step S308. In step S308, the application installer 206 determines whether the value of the variable n is smaller than the total number, N, of application counters available in the multifunction apparatus 100. If the value of the variable n is smaller than the total number, N, of the application counters, the application installer 206 returns the process to step S304. Otherwise, the application installer 206 ends the process.

Once the application has been installed in the above-described manner, the application can control the reader, the printer unit, etc., by executing jobs in accordance with given commands, thereby providing various functions.

Figure 5:
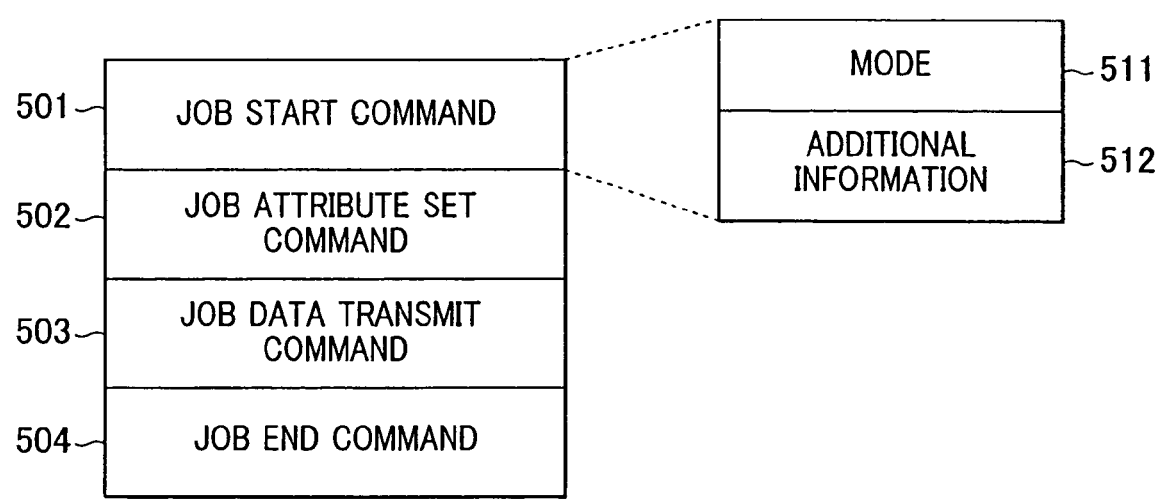
FIG. 5 is a diagram showing an example of a set of job commands.

FIG. 5 shows an example of a set of job commands. In this example, the set of job commands includes a job start command 501, a job attribute set command 502, a job data transmit command 503, and a job end command 504. The job start command 501 requests the controller to start a job. The job start command 501 includes parameters indicating a mode 511 and supplemental information 512 depending on the mode. Upon receiving the job start command 501, the controller starts to make preparations for the job. The job attribute set command 502 is a command to set attributes indicating the functions and status of the job. The attribute includes information indicating an application ID, job name, a job type, a data format, and a selected paper type. By issuing the attribute set command, a plurality of attributes can be successively set.

The job data transmit command 503 is a command to transmit data such as image data to be processed in a job. Depending on the job, there is no data to be processed. In such a case, the job data transmit command 503 may be removed. The job end command 504 is a command to indicate that all commands associated with a job have been transmitted. A set of commands from the job start command 501 to the job end command 504 is interpreted as one set of job commands. If a set of job commands is issued, the controller performs a proper process depending on given attributes, by controlling the reader 1, the printer unit 2, the file unit 5, etc., and controller issues a proper counter update request depending on the job type. The job start command includes information indicating an application ID of an application that has issued the job start command. Therefore, on the basis of the application ID included in the job start command, the controller and the counter updating means can determine which application has started the current job.

Figure 6:
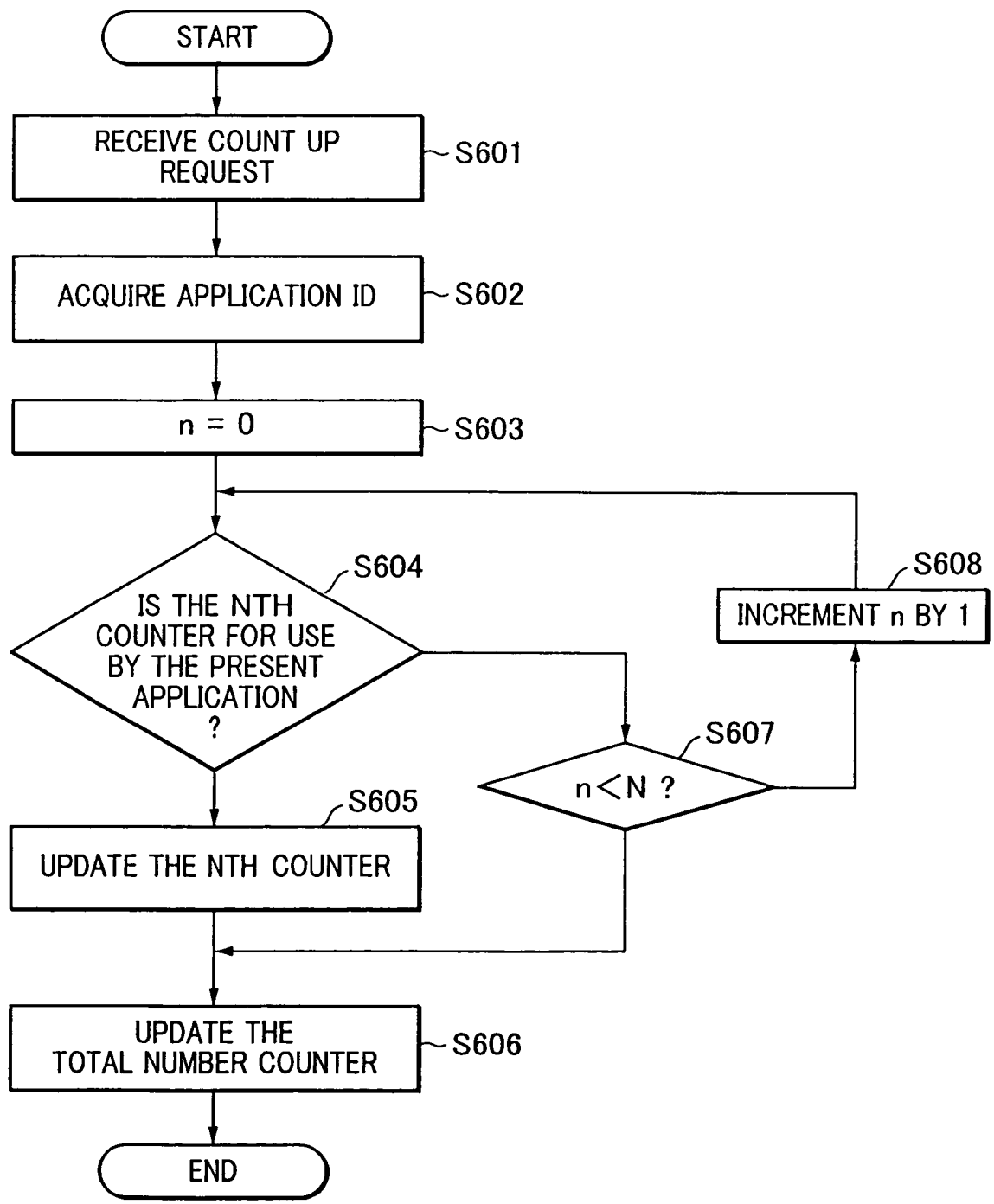
FIG. 6 is a flow chart showing a process performed by counter updating means to update a counter according to the first embodiment of the present invention.

A process performed by the counter updating means to update the counter according to the first embodiment is described below with reference to FIG. 6 showing the process in the form of a flow chart. First, in step S601, a counter update request is received. In the next step S602, an application ID of an update request issuer is acquired, and the process proceeds to step S603. In step S603, 0 is substituted into variable n. Thereafter, the process proceeds to step S604. In step S604, a table is checked to determine whether an nth counter is assigned to an application corresponding to the application ID acquired in step S602. If the nth counter is assigned to the application corresponding to the application ID acquired in step S602, the process proceeds to step S605. In step S605, the nth counter assigned for use in the present job is updated, and then the process proceeds to step S606. In step S606, the total number counter is updated, and then the process is ended. On the other hand, if it is determined in step S604 that the nth counter is not assigned to the application corresponding to the application ID acquired in step S602, the process proceed to step S607. In step S607, it is determined whether the variable n is smaller than the total number, N, of application counters. If n<N, then n is incremented by 1 in step S608, and the process returns to step S604. If it is not determined in step S607 that n<N, the process proceeds to step S606. In step S606, only the total number counter is updated, and then the process is ended.

FIG. 7 shows an example of a set of counters possessed by the multifunction apparatus 100. In this example, the counters include three types: copy counters, printer counters, and scan counters. A set of each type of counters includes one total number counter indicating the total counts and N application-specific counters (assigned counter numbers 1 to N, respectively). When a copy job is being processed, a corresponding copy counter is incremented each time one sheet is copied. Similarly, when a scan job is being processed, a scan counter is incremented each time one sheet is scanned. In a print job, a print counter is incremented each time one sheet is printed.

When the content of the counter number/application ID table is such as shown in FIG. 4, counters denoted by (a) in FIG. 7 are used by an application having an application ID of 11, and counters denoted by (b) in FIG. 7 are used by an application having the application ID of 51. For example, if the application having the application ID of 11 performs a copy job, a counter denoted by (c) in FIG. 7 and the total number counter are incremented. Similarly, if a print job is performed, a counter denoted by (d) in FIG. 7 and the total number counter are incremented. In a case in which a scan job is performed, a counter denoted by (e) in FIG. 7 and the total number counter are incremented. In a case in which a job such as a print job, a scan job, or a copy job is performed by a remote host computer, if an application ID of a job issuer has already been registered in the table, a counter corresponding to the application ID and the total number counter are incremented. If the application ID of the job issuer is not registered in the table, the job is rejected.

In the above-described manner, it is possible to manage as many count values as there are combinations of functions provided by the multifunction apparatus and applications that use one of the functions. It is also possible to calculate the sum of count values for each application and for each function. This makes it possible to bill the use of the multifunction apparatus not only on an application-by-application basis but also by an operation-by-operation basis, wherein an "operation" refers to a process performed by an application using a particular function of the multifunction apparatus. For example, when counter number 6 is assigned to a particular image processing application, if a particular image processing, such as copying of a digital watermark, is performed using this image processing application, a copy counter corresponding to counter number 6 is counted up. This makes it possible to manage the amount of usage of a particular operation such as copying using the image processing application. As a matter of course, the applications are not limited to the image processing application, but the management may also be performed in a similar manner for other applications such as an application for processing an XML document or an application for processing a particular document file may also be used. Furthermore, the functions provided by the multifunction apparatus are not limited to copying, printing, and scanning, but the multifunction apparatus may provide another function such as finishing, binding, or punching.

Figure 8:
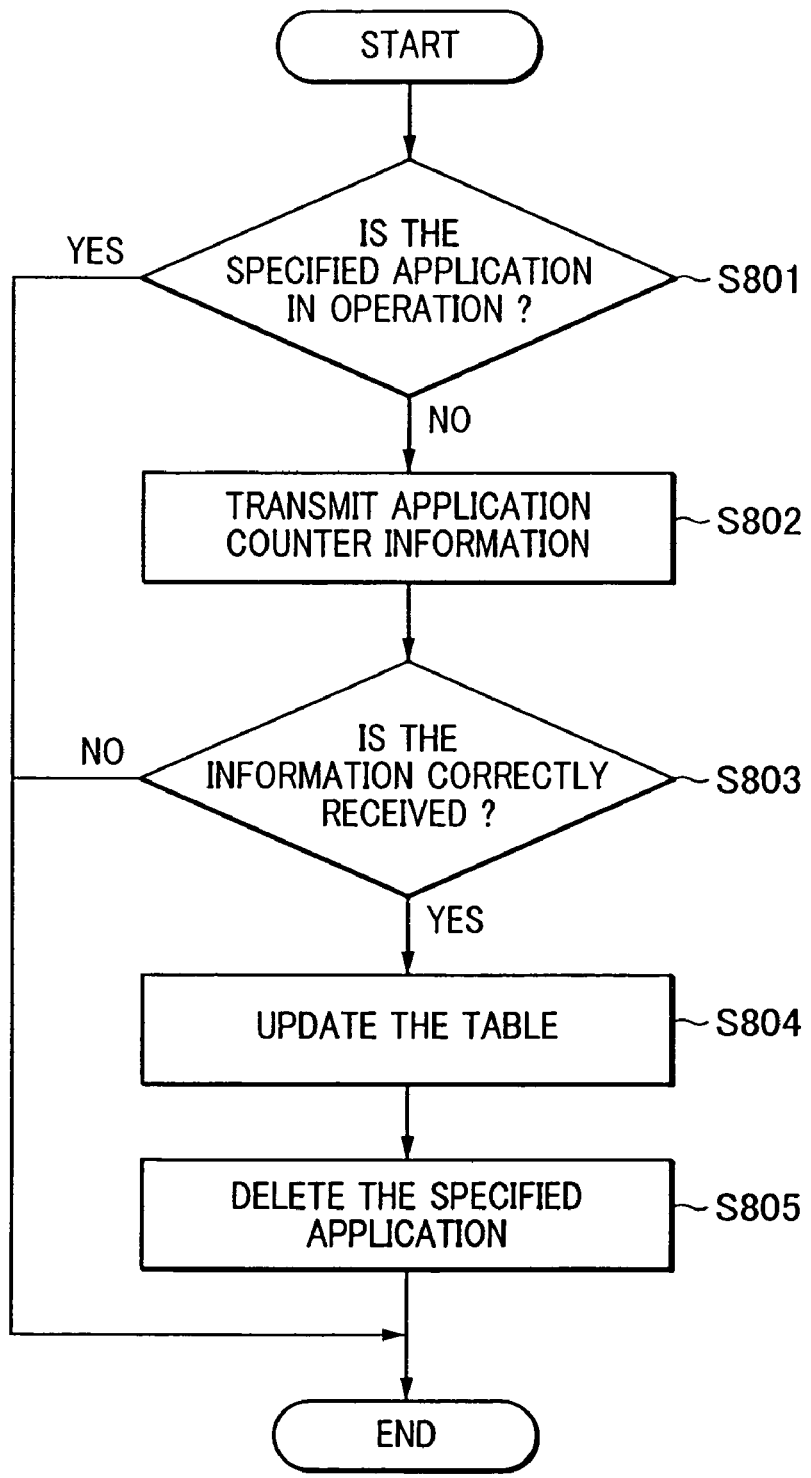
FIG. 8 is a flow chart showing a process of uninstalling an application installed in a multifunction apparatus according to the first embodiment of the present invention.

Now, described below is a process of uninstalling an application which has been installed on the multifunction apparatus and whose application ID has been assigned a counter. FIG. 8 is a flow chart showing the process of uninstalling an application that has been installed on the multifunction apparatus 100.

First, in step S801, it is checked whether a specified application is operating. If the specified application is operating, the uninstall process is ended without performing anything. If the specified application is not operating, it is determined that the application can be uninstalled without encountering any problem, and thus process proceeds to step S802. In step S802, counter information and application information related to the application to be uninstalled are transmitted to the accounting server 13. Thereafter, the process proceeds to step S803. In step S803, it is checked whether the transmitted information has been correctly received by the accounting server 13. If the information has been correctly received, the process proceeds to step S804. However, if the information is not correctly received, the process is ended without uninstalling the application. In step S804, the counter number/application ID table is updated such that the counter assigned to the application ID of the application to be uninstalled is cancelled and brought into an unused state. In step S805, the application is uninstalled by deleting it from the storage apparatus 6, and the process is ended.

In the present embodiment, as described above, when an application is installed, an available counter is dynamically assigned to the application. If some processing is performed by the application, the counter assigned to that application is counted up. Thus, it is possible to manage the count values of copying, printing, and scanning, for each application.

When an application is uninstalled, application information and counter information associated with that application are stored in the accounting server. Thus, it is possible to freely install and uninstall an application without losing count information.

In the present embodiment, installation process is terminated if it is found that the same application has already been installed. Alternatively, version information associated with an application may be checked, and installation may be performed if the version information indicates that the application is of a later version. Still alternatively, a user may determine whether installation should be performed.

Although in the present embodiment, the application installer 206 is one of applications that operate on the application management module 204, the application installer 206 may be a module embedded in the controller 202.

Although in the present embodiment, there are provided three types of counters, that is, copy counters, print counters, and scan counters, the types of counters are not limited to those. There may be an arbitrary number of counter types.

The number of counter types for the same function may be increased, for example, depending on the paper sizes.

Although in the present embodiment, one set of counters is assigned to one application, group IDs may be introduced and one set of counters may be shared by a plurality of applications.

Although in the present embodiment, all counters except for the total-number counters are dynamically assigned, a counter may be permanently assigned to a particular application preinstalled on the multifunction apparatus.

In the present embodiment, when a job request is received from the outside, if the application ID of that job is not registered in the table, the job is rejected. Alternatively, the job may be accepted, and only the total-number counter may be counted up.

Second Embodiment

Now, an image forming apparatus according to a second embodiment of the present invention is described below.

The construction of a multifunction apparatus serving as the image forming apparatus according to the second embodiment is similar to that according to the first embodiment described above in detail with reference to FIG. 1, and thus a duplicated description thereof is not given herein. However, in this second embodiment, the host computer 11 serves as a file server in which applications are stored. The difference of the second embodiment from the first embodiment is described below.

Figure 9:
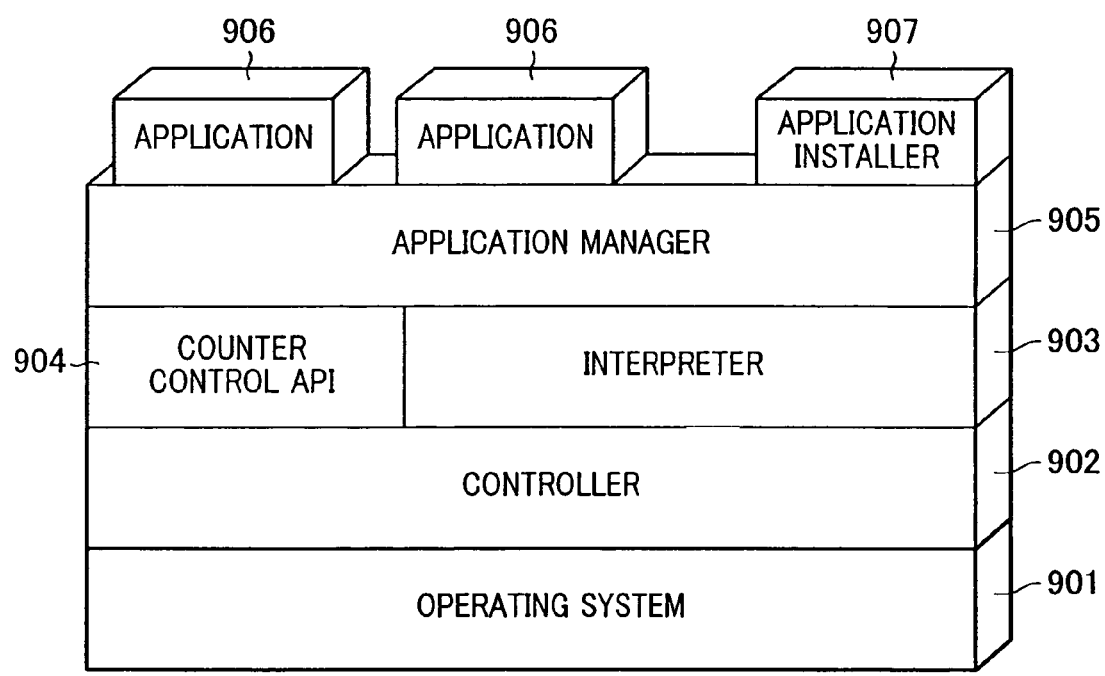
FIG. 9 is a diagram showing an example of a hierarchical structure of software modules of a multifunction apparatus according to a second embodiment of the present invention.

FIG. 9 shows a hierarchical structure of software modules of the multifunction apparatus 100 according to the second embodiment of the present invention. The software module includes an operating system (OS) 901. A controller module 902 for controlling various devices is disposed in a layer above the operating system 901. In a further upper layer, there are disposed an interpreter module 903 for executing programs on a step-by-step basis and a general-purpose counter control program interface (hereinafter, referred to as a general-purpose counter control API) 904 for controlling general-purpose counters (that will be described later). In a further higher layer, there is provided an application management module 905 for managing applications that can be dynamically installed and removed. Applications 906 for implementing various functions operate under the control of the application management module 905 (amount-of-usage management means). An application installer 907 for installing/uninstalling applications also operates under the control of the application management module 905. Each application 906 can use a general-purpose counter control API 904 via the application management module 905. Those software programs are executed on a CPU (not shown) in the core 10.

Figure 10:
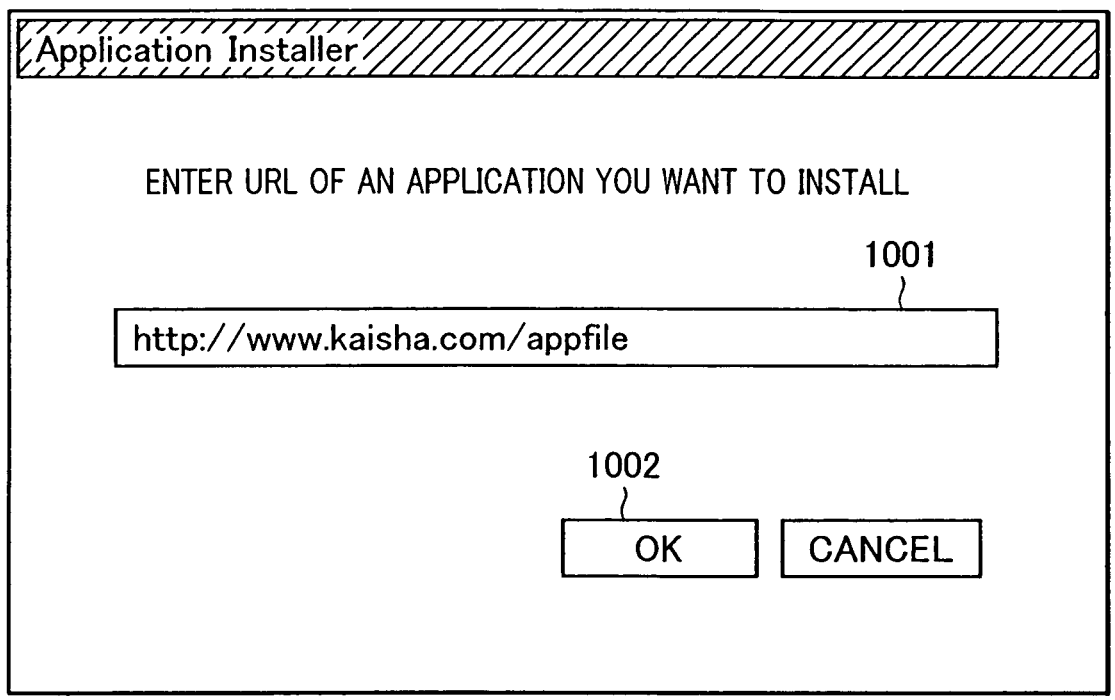
FIG. 10 is a diagram showing an example of a dialog screen for installing an application, according to the second embodiment of the present invention.

Referring to FIGS. 10 and 11, a process performed by the application installer 907 to install one of applications stored in the host computer 11 into the multifunction apparatus 100 is described below. Herein, the host computer 11 is assumed to have a capability of a Web server and have a particular URL. In the present embodiment, for example, applications are located at URL "http:www.kaisha.com/aafile". If this URL is specified on the operation control unit 14 of the multifunction apparatus, a specified application is downloaded from a storage area corresponding to the URL in the host computer, and the downloaded application is automatically installed in the multifunction apparatus. Instead of using the operation control unit 14, an application may also be downloaded by accessing the URL via an operation control screen of an external computer 12 and transferring the downloaded application to the core 10 of the multifunction apparatus via a network interface.

FIG. 10 is a diagram showing an example of a dialog screen for installing an application, according to the second embodiment of the present invention. This dialog screen is displayed on the operation control unit 14 of the multifunction apparatus 100, when an installation button is clicked on a main screen (not shown) of the application installer 907. More specifically, if an OK button 1002 is clicked after inputting, into a text field 1001, URL pointing to the host computer 11 in which application information to be installed, then the application installer downloads the specified application from the host computer 11 and installs the downloaded application. If a cancel button on the screen shown in FIG. 10 is clicked, the screen is closed and the main screen (not shown) of the application installer is opened again.

Figure 13:
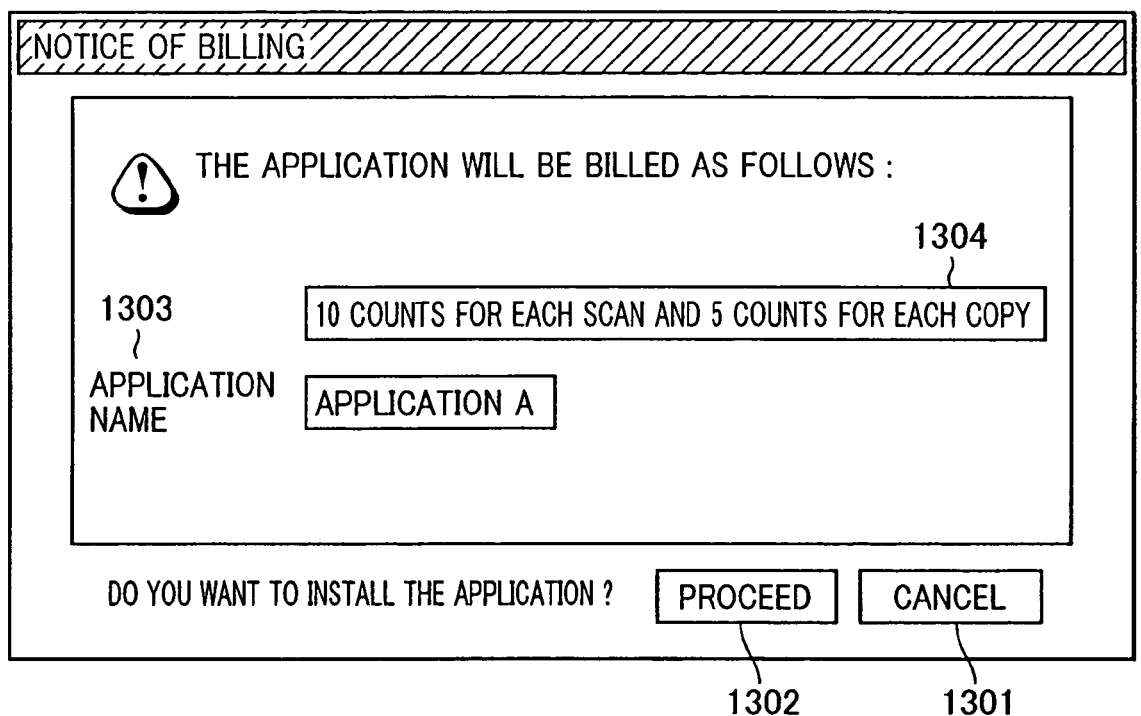
FIG. 13 is a diagram showing an example of a notice screen for notification of count-up units in installation of an application, according to the second embodiment of the present invention.

FIG. 11 is a flow chart showing a process performed in response to pressing of the OK button 1002. FIG. 12 shows an example of a counter number/application ID table according to the second embodiment. FIG. 13 is a diagram showing an example of a notice screen for notification of count-up units in installation of an application, according to the second embodiment of the present invention. Referring to FIGS. 11 to 13, a process performed in response to pressing of the OK button is described below.

If the OK button 1002 is pressed, the application installer 907 acquires, in step S1101, application information from a location specified by data input in the text field 1001.

FIG. 14 shows an example of a set of elements of application information according to the second embodiment. In this example shown in FIG. 14, the application information includes vendor name, application ID serving as an identifier of an application, application name, version, date of last updating, number of counters used, counter type, count-up unit, memory used, and archive file URL indicating a location from which to acquire the program.

Referring again to FIG. 11, in step S1101, if the application installer 907 successfully acquires an application information that is a typical example of attribute information of a program, the process proceeds to step S1102. If the application information is not acquired, the process is ended. In step S1102, upon acquiring the application information, the application installer 907 serving as a preferred example of detection means according to the present invention detects an unused counter of a counter type specified in the application information. If an unused counter number is not detected, that is, if there is no counter available for managing the amount of use of a new program that is input from, for example, the external host computer 11 or the like via the network interface (input unit) of the multifunction apparatus 100, the process is ended.

On the other hand, if unused counters are detected in step 1102 for all counter types specified in the application information, the process proceeds to step S1103. In step S1103, on the basis of the application information, a dialog (FIG. 13) is displayed on the operation control unit to inform a user of the count-up unit. For example, an application name and an amount to be charged each time the application is executed are displayed. In the next step S1104, it is determined which button on the dialog screen (FIG. 13) is pressed. If it is determined that a cancel button 1301 has been pressed, the process is terminated. However, if it is determined that a proceed button 1302 has been pressed, the process proceeds to step S1105. In step S1105, a program is downloaded from a location specified by an archive file URL described in the application information. If the program cannot be successfully downloaded in step S1105, an error message is displayed as required, and the process is ended. If the program is successfully downloaded in step S1105, the process proceeds to step S1106. In step S1106, the application installer (counter management means) stores the program downloaded in step S1105 into the storage apparatus 6 such that the program can be used. Thereafter, the process proceeds to step S1107. In step S1107, the application installer describes the counter number detected in step S1102 and the application ID included in the application information into a newly created record in the counter number/application ID table. Furthermore, as required, the application management module 204 initializes the counter values of the counters detected by the application installer. Thereafter, the process is ended. In the case in which an unused counter cannot be detected, that is, in the case in which the number of counters is insufficient, the application installer may create a new counter to be assigned to a new application and may initialize the new counter.

On the notice screen shown in FIG. 13, an application name of an application to be installed is displayed in an application display field, and count-up information (billing information) indicating count-up units in which charge is imposed for usage of a function of the multifunction apparatus 100, such as a scanning function or a copying function, is displayed in a count-up information display field 1304. If a user decides to accept the count-up condition, the user clicks a proceed button 1302 to install the application.

FIG. 12 shows examples of counter number/application ID tables according to the second embodiment of the present invention. A counter number/application ID table is prepared separately for each of a monochrome printing function, a color printing function, a monochrome copying function, a color copying function, and a scanning function. In each table, the correspondence between counter numbers assigned to respective counters and application IDs specifying applications is described. The functions provided by the multifunction apparatus 100 are not limited to those described above, but the present invention may also be applied to other functions, such as a finishing function including a stapling function and a binding function, provided by the multifunction apparatus 100, as long as the amount of usage of functions (the number of times that functions are used, or the usage time) can be detected. In FIG. 12, 0xFFFFFFFF is a code indicating that a counter is in an unused state. In this specific example shown in FIG. 12, only one application having the application information shown in FIG. 14 is installed on the multifunction apparatus, and a scan counter having a counter number of 1 and a general-purpose counter having a counter number of 1 are applied to the application having an application ID of 11. The other counters are unused. On the basis of the table described above, the amounts of usage of applications are managed on an application-by-application basis. More specifically, when a particular application performs a particular operation using a function of the multifunction apparatus (for example, a scanning operation, a copying operation, a printing operation, or a finishing operation), an counter having a counter number assigned, in the table, to the particular application is counted up.

The above-described management of the amounts of usage of applications on the application-by-application basis is performed by the application management module 204 provided in the multifunction apparatus 100. In response to inputting attribute information associated with an application to the multifunction apparatus 100, the application installer 206 detects a counter assigned for use in management of the amount of usage of the application corresponding to the application ID that is a typical example of identification information of a program to be installed.

The application management module 204 manages an installed application in relation to the counter detected by the application installer 206.

The program identification information may include plural pieces of information for identifying a program. For example, for an application program, the program identification information may include an application ID and an application name. In the case of an application program module supplied in the form of a file, a module name is assigned to the application program module, and a file name is assigned to the file in which the application program module is stored. Such a file name and a module name can be program identification information. Therefore, when an application program module is input together with associated application information into the multifunction apparatus via the network interface and stored in the storage apparatus provided in the multifunction apparatus, it may be determined whether to assign a counter to the application program module.

The installed application program, as in the first embodiment, can control the reader 1, the printer unit 2, the finisher 15, etc., by executing a set of job commands (FIG. 5), thereby using various functions provided by the multifunction apparatus. The details of the procedure have been described in the first embodiment, and thus a duplicated description is not given herein.

Figure 15:
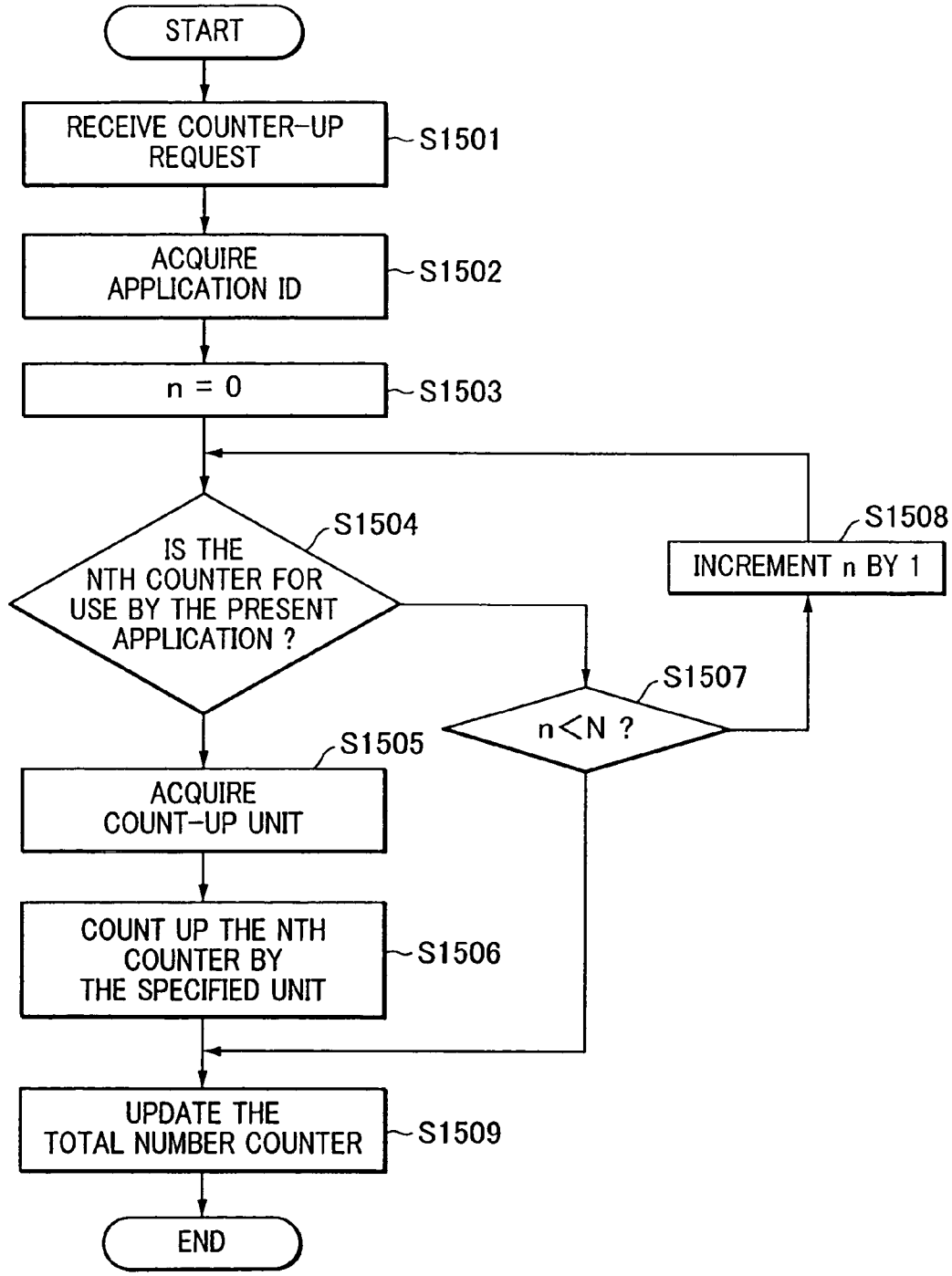
FIG. 15 is a flow chart showing a process performed by counter updating means to count up a counter according to the second embodiment of the present invention.

FIG. 15 is a flow chart showing a process performed by counter updating means in the application management module to count up a counter according to the second embodiment of the present invention. Referring to the flow chart shown in FIG. 15, a process performed in response to receiving a request for counting up a particular counter is described below. First, in step S1501, the application management module receives a count-up request, for example, from the core. Thereafter, the process proceeds to step S1502. In step S1502, an application ID of an issuer of the count-up request is acquired, and the process proceeds to step S1503. In step S1503, 0 is substituted in variable n, and the process proceeds to step S1504. In step S1504, the table is checked to determine whether an nth counter is assigned to an application having the application ID acquired in step S1502. If the nth counter is assigned to the application having the application ID acquired in step S1502, the process proceeds to step S1505.

In step S1505, the application management means acquires a count-up unit defined for the current job type from the application information. In the next step S1506, the nth counter is counted up by a value equal to the unit acquired in step S1505, and the process proceeds to step S1509. In step S1509, the application management means counts up the total number counter by a value specified in the application information, and the process is completed. On the other hand, if the application management means determines in step S1504 that the nth counter is not assigned to the application having the application ID acquired in step S1502, the application management means advances the process to step S1507. In step S1507, it is determined that variable n is smaller than the total number, N, of application counters. If n<N, then the process proceeds to step S1508. In step S1508, n is incremented by 1, and the process returns to step S1504. If it is determined in step S1507 that n is not smaller than N, the process proceeds to step S1509. In step S1509, only the total number counter is counted up by a value specified in the application information, and the process is ended.

FIG. 16 shows an example of a set of counters provided in multifunction apparatus according to the second embodiment. In this example, the set of counters includes six types of counters, that is, copy counters (monochrome copy counters), scan counters, print counters (monochrome print counters), color copy counters, color print counters, and general-purpose counters. Each type includes N counters (assigned counter numbers 1 to N) for use by respective applications and also includes a total number counter for indicating the total count. For example, when a monochrome copy job is performed, a copy counter is counted up, each time one sheet is copied, by a value defined in the application information. Similarly, a scan counter, a print counter, a color copy counter, or a color print counter is automatically counted up by the controller each time a particular operation is performed during a scan job, monochrome print job, a color copy job, or a color print job. A general-purpose counter is counted up in response to a command issued by an application via the general-purpose counter control API.

For example, when an application having application information shown in FIG. 14 is installed, if the application having an application ID of 11 executes a scan job, a counter denoted by (a) in FIG. 16 is incremented by 10 each time one sheet is scanned. When the general-purpose counter control API is set to be called each time an application having an application ID of 11 issues a job, then a counter denoted by (b) in FIG. 16 is incremented by 1 each time the application having the application ID of 11 issues a job.

Figure 17:
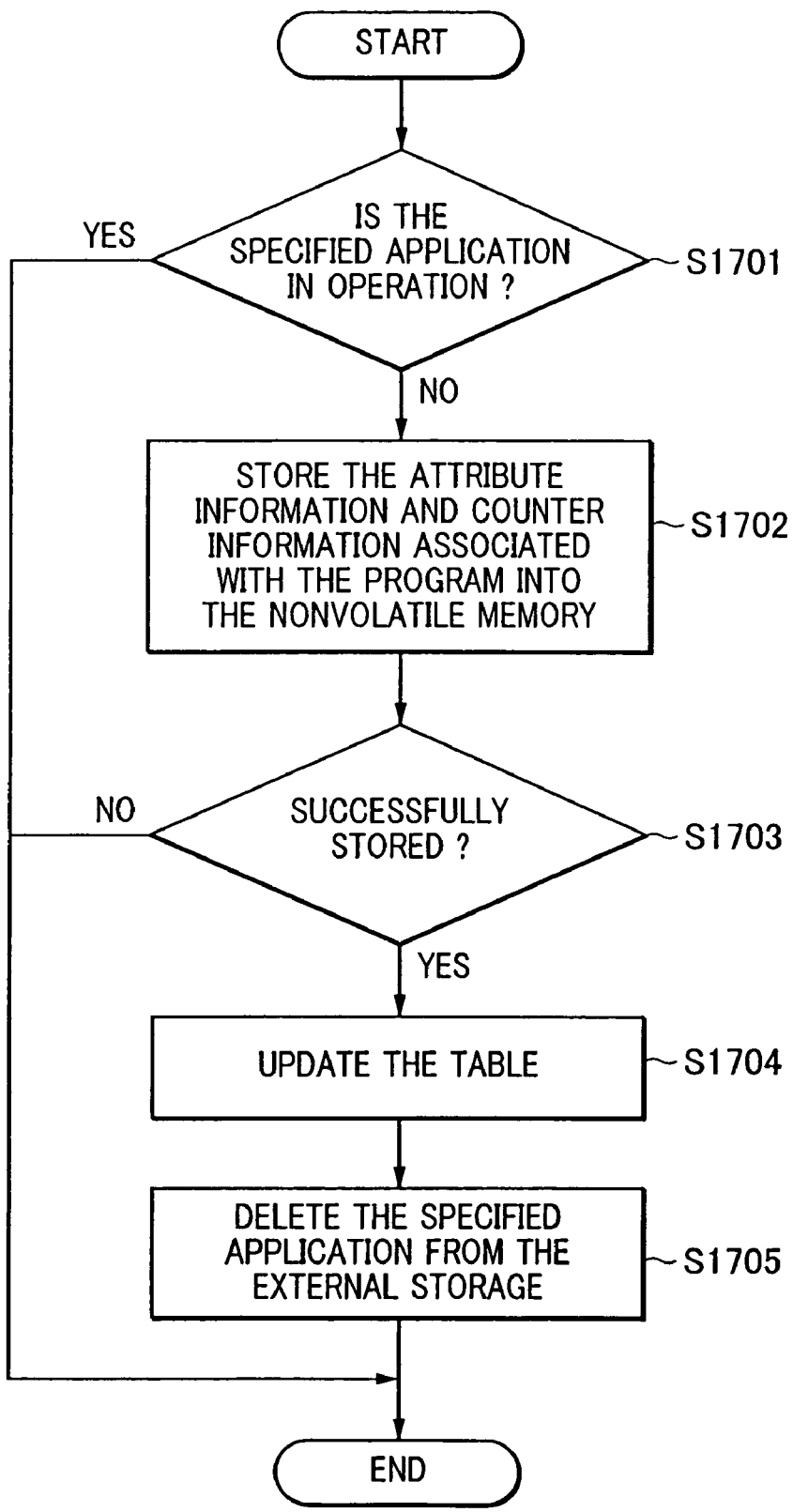
FIG. 17 is a flow chart showing a process of uninstalling an application installed in a multifunction apparatus according to the second embodiment of the present invention.

Now, referring to FIG. 17 showing, in the form of a flow chart, a process of uninstalling an application installed in the multifunction apparatus according to the second embodiment, the uninstallation process is described below. First, in step S1701, the application installer 203 determines whether a specified application is in operation. If the specified application is in operation, the application installer 203 ends the uninstallation process without performing anything. If the specified application is not in operation, it is determined that the specified application can be uninstalled without causing any problem, and thus the process proceeds to step S1702. In step S1702, the application installer 203 (detection means) searches the counter number/application ID table for counter information associated with the application to be uninstalled and the application information. The retrieved counter information and application information are stored in a nonvolatile memory provided in the multifunction apparatus. Thereafter, the process proceeds to step S1703.

In step S1703, it is determined whether the counter information and the application information have been successfully stored in the nonvolatile memory. If they have been successfully stored, the process proceeds to step S1704. However, if the counter information and the application information fail to be stored, the process is ended without uninstalling the application. In step S1704, the application management module 204 (counter management means) updates the counter number/application ID table such that the assignment of the counter associated with the application ID of the application to be uninstalled is cancelled, and the counter is brought into an unused state. In the next step S1705, the application management module 204 deletes the application from the storage apparatus 6 and ends the process.

In the present embodiment, as described above, when an application is installed, a notice-of-billing dialog is displayed. If a user decides to accept a count-up unit to be employed in charging for each operation, and if the user presses the proceed button, the application is installed. The general-purpose counters are available for respective applications whereby the number of times each application is executed or the amount of processing executed by the application can be managed.

When an application is uninstalled, application information and counter information associated with counters used by the application are stored in the memory provided in the multifunction apparatus. This makes it possible to repeatedly install and uninstall applications as required, without losing the count information.

In accordance with upper limits set to respective applications and respective functions, respective operations of each application are limited as described below with reference to FIGS. 18 and 19.

Figure 18:
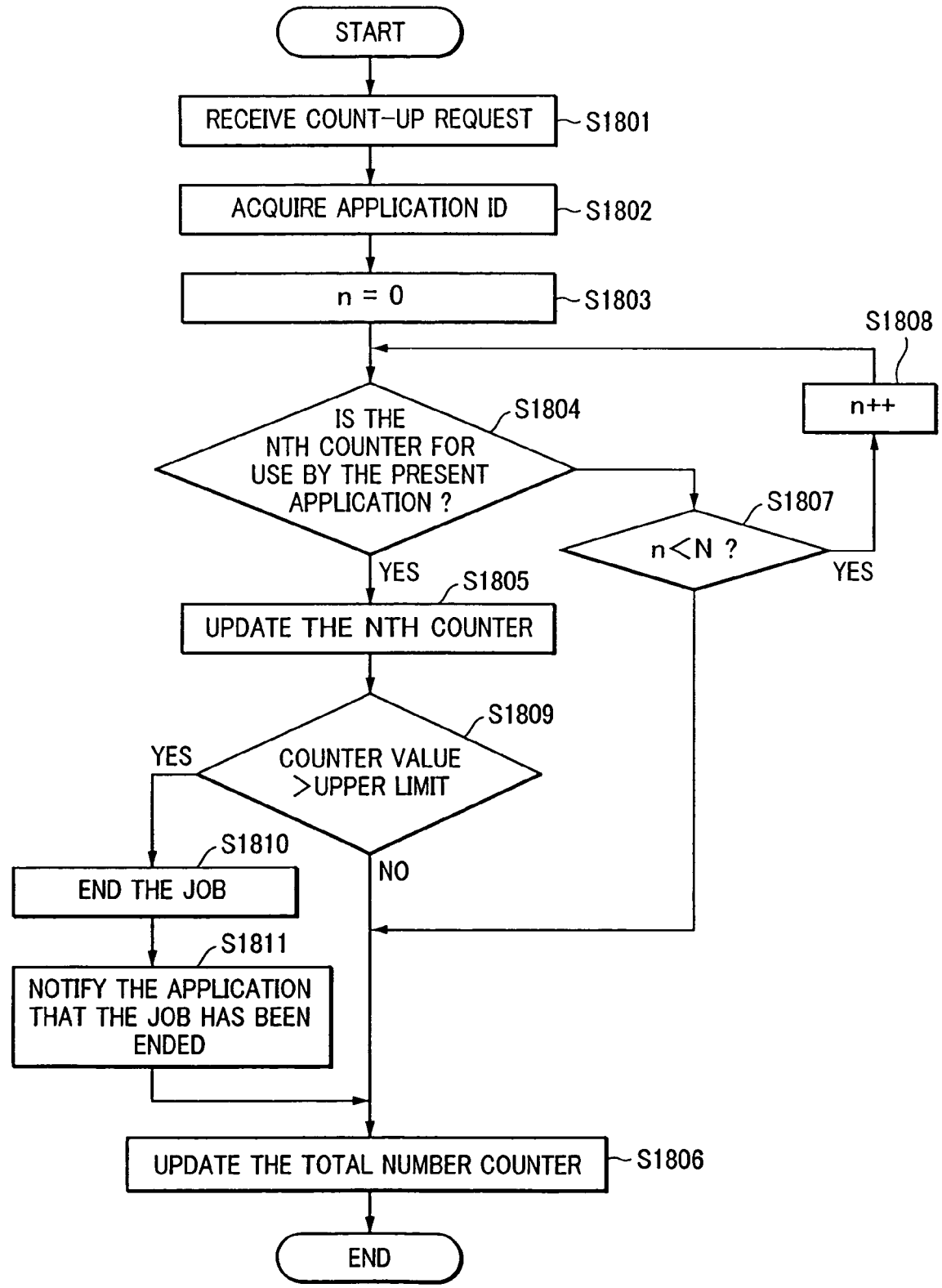
FIG. 18 is a flow chart showing a process of updating counters and managing counter upper limits for respective applications.

FIG. 18 is a flow chart showing a process of updating counters by counter updating means and a process of managing counter upper limits by counter upper limit management means according to the first embodiment of the present invention. The process shown in FIG. 18 is similar to the process shown in FIG. 6 except that the process shown in FIG. 18 includes additional steps of managing upper limits. Referring to the flow chart shown in FIG. 18, the process of updating counters by the counter updating means and the process of managing counter upper limits by the counter upper limit management means are described below.

If a counter update request is received, in step S1801, from the core 10, the process proceeds to step S1802. In step S1802, an application ID of an issuer of the counter update request is acquired, and the process proceeds to step S1803. In step S1803, 0 is substituted into variable n, and the process proceeds to step S1804. In step S1804, a table is checked to determine whether an nth counter is assigned to an application corresponding to the application ID acquired in step S1802. If the nth counter is assigned to the application having the application ID acquired in step S1802, the process proceeds to step S1805. In step S1805, the nth counter assigned for use in the present job is updated, and the process proceeds to step S1809. On the other hand, if it is determined in step S1804 that the nth counter is not assigned to the application corresponding to the application ID acquired in step S1802, the process proceeds to step S1807. In step S1807, it is determined that variable n is smaller than the total number, N, of application counters. If n<N, then n is incremented by 1 in step S1808, and the process returns to step S1804. However, if it is determined in step S1807 that n is not smaller than N, the process proceeds to step S1806. In step S1806, only the total number counter is updated, and then the process is ended.

In step S1809, the upper limit table shown in FIG. 19 is checked to detect an upper limit imposed on an nth counter for use in the current job type, and the counter value updated in step S1805 is compared with the detected upper limit. If the comparison indicates that the counter value is not greater than the upper limit, then the total number counter is updated in step S1806, and the process is ended. However, if the counter value is greater than the upper limit, the process proceeds to step S1810. In step S1810, a job termination command is issued to the core 10 shown in FIG. 1, and the process proceeds to step S1810. In step S1811, an event indicating that the job has been forcedly terminated is transmitted to the issuer of the job, that is, the application (205 in FIG. 2) corresponding to the application ID acquired in step S1802. Thereafter, in step S1805, the total number counter is updated, and the process is ended.

In the present embodiment, the job is forcedly terminated in step S1810. Alternatively, without forcedly terminating the job, an event may be simply transmitted to the application that has issued the job to notify that the counter has exceeded the upper limit, and the application may perform a predetermined operation in response to receiving the event. The predetermined operation performed by the application may be to stop issuing a further job, to display a message to warn a user that the upper limit on the usage of the application licensed to the user has been reached, to display a dialog screen on the operation control unit 14 of the multifunction apparatus 100 to prompt the user to install a license file that is a preferred example of license information of the application, or to inform the user of the above-described information via voice from a speaker (not shown) provided in the computer. Alternatively, the dialog screen may be displayed on a display of the network server or the host computer by transmitting necessary information to the network server or the host computer.

FIG. 19 shows an example of a counter upper limit management table stored in the multifunction apparatus 100. In the example shown in FIG. 19, upper limits are defined for counters of respective three types, that is, copy counters, print counters, and scan counters, and each type includes N counters (assigned counter numbers 1 to N) for use by respective applications.

For example, when the counter number/application ID table has the content shown in FIG. 4, upper limit values denoted by (a) in FIG. 19 are applied to an application having an application ID of 11, and upper limit values denoted by (b) in FIG. 19 are applied to an application having an application ID of 51. More specifically, for example, when the application having the application ID of 11 executes a copy job, an upper limit value denoted by (c) in FIG. 19 is applied. Similarly, when a print job is executed, an upper limit value denoted by (d) in FIG. 19 is applied, while an upper limit value denoted by (e) in FIG. 19 is applied when a scan job is executed. When a print job, a scan job, or a copy job is executed in response to a request issued by a remote host, if an application ID that has issued the job has already been registered in the table, an upper limit value corresponding to the application ID is applied. As described earlier with reference to FIG. 7, in the case in which the application ID of the issuer of the job is not registered in the table, the job is rejected. In this case, as a matter of course, the upper limit value is not registered. For example, there may be a OCR application that uses the scanning function of the multifunction apparatus to extract character information from an image, recognize the extracted character information, and convert it into text information expressed in codes such as ASCII codes. When there are applications that use particular functions of the multifunction apparatus to achieve extended functions as in the above example, imposing limits on the amounts of usage, monitoring the amounts of usage, and charging for usage are managed for respective combinations of an application and a function. For example, in a combination of the OCR application program and the scanning function of the multifunction apparatus 100, when an upper limit is set such that the multifunction apparatus 100 is not allowed to be used beyond the upper limit, the application management module 905 limits the usage of the function of the multifunction apparatus 100 by controlling the controller via the API. Specific examples of combinations of an application program and a function of the multifunction apparatus 100 include a combination of an advanced image processing application and the printing function, a combination of an image processing application and the scanning function, and a combination of the printing function, facsimile function, or the scanning function and an office application such as a spreadsheet program or a document composition program.

Thus, as many count values and upper limit values as there are combinations of a function provided by the multifunction apparatus and an application that uses the function are managed. In the management, the count values and the upper limit values can be managed separately for respective applications and for respective functions. Thus, the count values and the upper limit values can be managed separately for particular operations of respective applications.

For example, when counter number 6 is assigned to a copy application, a copy counter corresponding to counter number 6 is counted up in response to using the copy application, and the usage of the copy application is limited to an upper limit value set to counter number 6. The upper limit values may be set by a particular license management mechanism, and licenses to use applications as many times as defined by the upper limit values may be granted to users. This makes it possible to charge users in advance for usage of applications depending on the upper limits of the usage of applications. The functions provided by the multifunction apparatus are not limited to copying, printing, and scanning, but functions may be facsimile transmission/reception, finishing, binding, or punching. In any case, an upper limit may be set for each combination of an application and a function used by the application. This makes it possible to limit a particular function for a particular application, limit outputting of a job issued by a particular application by controlling a particular function, and forcedly delete a particular application.

Figure 21:
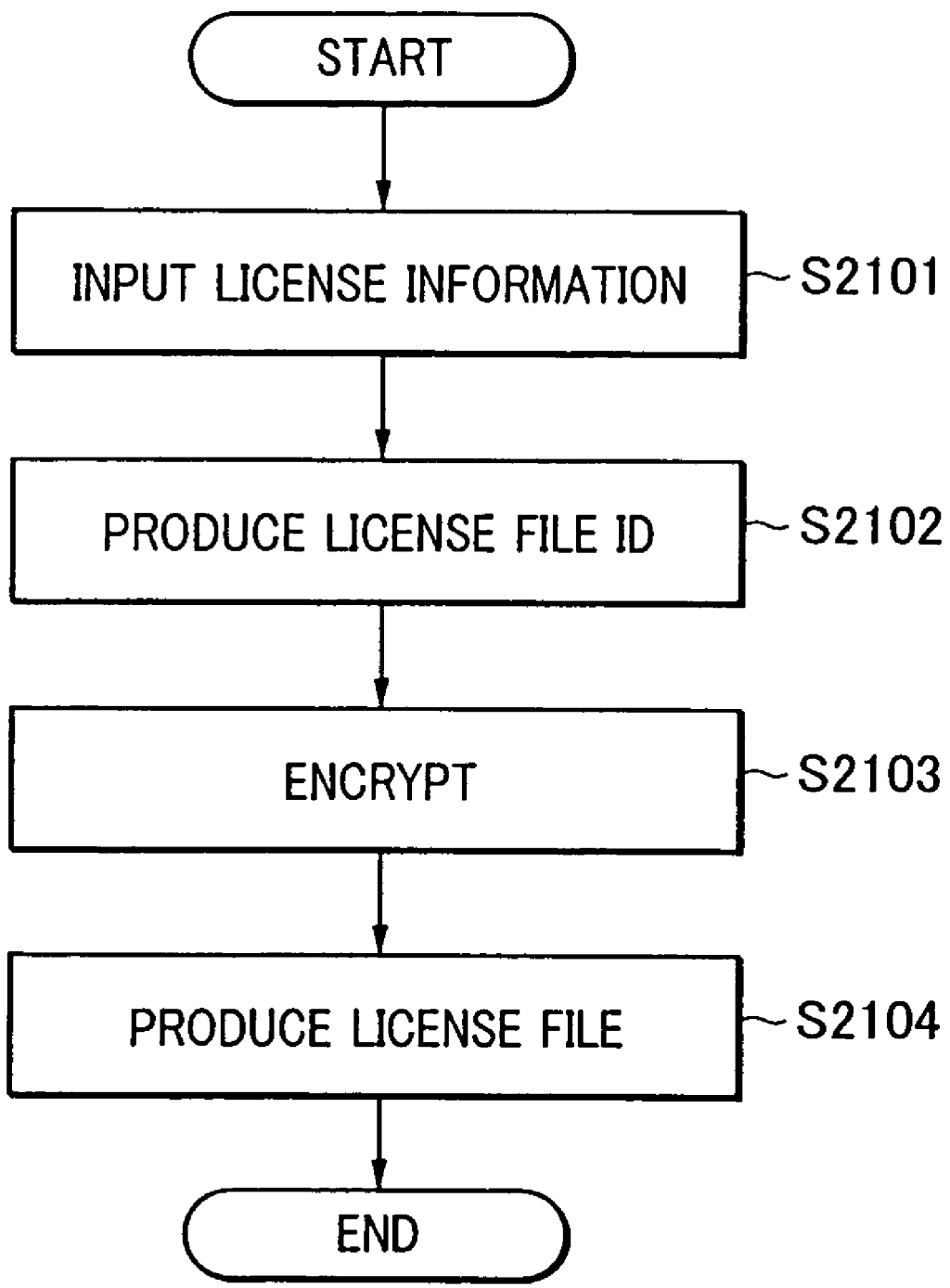
FIG. 21 is a flow chart showing a process of producing a license file.

FIG. 20 shows an example of the content of a license file. FIG. 21 shows a process of producing a license file, performed by a host computer (not shown but having a hardware configuration similar to that of the personal computer 2701 shown in FIG. 27) of an owner of the proprietary right of an application. In FIG. 20, a LicenseFileID attribute is automatically given in the process shown in FIG. 21. The LicenseFileID attribute is uniquely determined such that respective license files have different values.

A DeviceSerialNo attribute indicates a serial number of a multifunction apparatus that is allowed to install the license file. The DeviceSerialNo attribute can include a plurality of serial numbers. In this case, serial numbers are delimited by commas. An ExpirationDate attribute indicates an expiration date until which the license file is allowed to be installed. An ApplicationID attribute indicates an application ID of an application whose usage right is granted by the present license file.

A ValidatePeriod attribute indicates a period in units of days during which the usage right of the application is granted by the present license file.

ApplicationKey attribute is an application key that is necessary to install the application whose usage right is granted by the present license file. That is, the application code is provided in an encrypted form, and the application can be installed only when the encrypted application is successfully decrypted using the application key. If the application is successfully installed, the key used in the decryption is stored in the device as shown in FIG. 24, for later use in authentication of a license file.

A MaxCopy attribute indicates the maximum number of times that the application, whose usage right is granted by the present license file, is allowed to perform copying. The values specified herein is set, via the process shown in FIG. 22, in a corresponding field of the counter upper limit table (FIG. 19) stored in the device. In addition, a MaxPrint attribute indicating the maximum number of times that printing is allowed to performed and a MaxScan attribute indicating the maximum number of times that scanning is allowed to be performed can also be set in the license file.

An AdditionalPrint attribute indicates a value added to the current number of times that the application, whose usage right is granted by the present license file, is allowed to perform printing. The value specified by the AdditionalPrint attribute is added, in the process shown in FIG. 22, to the corresponding upper limit described in the counter upper limit table (FIG. 19) stored in the device. An AddtionalScan attribute indicates a value added to the current number of times that the application, whose usage right is granted by the present license file, is allowed to perform scanning.

The license file can also include a value indicating the maximum or additional number of times that an operation of another job type. Furthermore, the license file can include a value added to the current number of times that the application is allowed to perform copying.

FIG. 21 shows the process of producing a license file, performed by a host computer of an owner of the proprietary right of an application.

In step S2101, license information is input. In this step, all attributes shown in FIG. 20 except for the LicenseFile attribute are input. The inputting may be performed from a text file in which license information is described in advance. Alternatively, attributes may be input by specifying optional parameters via a command line-based interface.

In step S2102, a LicenseFileID attribute is created. Herein, a UUID (Universal Unique ID) is used to avoid the created LicenseFileID from being equal to any existing License-FileID. The UUID has a data length of 128 bits and may be created on the basis of 32-bit data representing the physical network address (MAC address) of the host computer that created the LicenseFileID attribute and 96-bit data indicating a time. Alternatively, an unique identification number may be produced using a CRC tool and may be used as the license file ID. To ensure that identification numbers are really unique, it is required to manage all identification numbers at the same location.

In step S2103, the license information input in step S2101 and the license file ID attribute created in step S2102 are encrypted. The encryption is performed by means of public key cryptography using a public key corresponding to a private key possessed by the multifunction apparatus 100 according to the RSA algorithm or the like. Alternatively, the encryption may be performed by means of common key cryptography using a private key possessed by the multifunction apparatus 100 according to the DES algorithm or the like.

In step S2104, a license file including the encrypted license information is produced and stored in the file system. Thereafter, the process is ended. The license file produced in the above-described process can be installed in the multifunction apparatus 100 using the Web server capability or the electronic mail capability of the multifunction apparatus 100.

Figure 22:
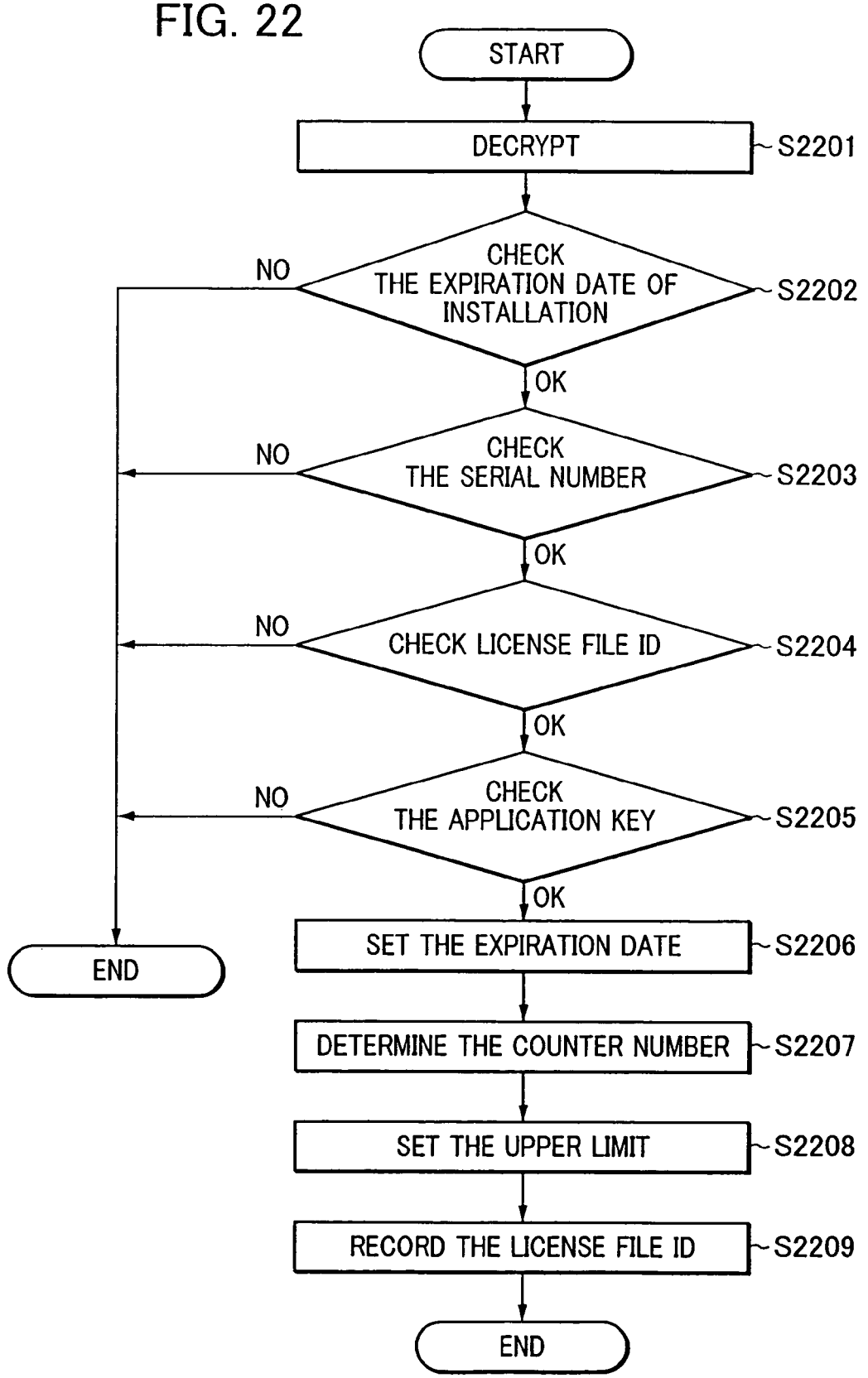
FIG. 22 is a flow chart showing a process associated with a license file.

FIG. 22 shows a process performed on the license file installed in the multifunction apparatus 100, to set upper limits in the counter upper limit table shown in FIG. 19. The process shown in FIG. 22 is performed by the multifunction apparatus 100. In step S2201, the installed license file is decrypted using the private key possessed by the multifunction apparatus 100 according to the public key cryptography. In the case in which the license file has been encrypted using the common key cryptography, the decryption is performed using the private key possessed by the multifunction apparatus 100 according to the common key cryptography.

In step S2202, the content of the decrypted license file is checked to determine the expiration date of installation. More specifically, the detection of the expiration date of installation is performed by comparing the value of the ExpirationDate attribute described in the license file shown in FIG. 20 with the current date. If the current date is after the date indicated by the ExpirationDate attribute, the process is terminated without performing installation.

In the next step S2203, the serial number of the multifunction apparatus 100 is verified. The verification of the serial number is preformed by comparing the value of the DeviceSerialNo attribute described in the license file shown in FIG. 20 with the serial number possessed by the multifunction apparatus 100. If the serial number possessed by the multifunction apparatus 100 is not found in the DeviceSerialNo attribute, the process is terminated without performing the installation.

In the next step S2204, it is determined whether the same license file has already been installed. The determination is performed by comparing the value of the LicenseFileID described in the license file shown in FIG. 20 with LicenseFileID attributes of license files that have already been installed in the multifunction apparatus 100. The LicenseFileID attributes of already-installed license files can be found in a license file ID table, such as that shown in FIG. 23, stored in the multifunction apparatus 100. If the value of the LicenseFileID of the license file to be installed is included in a column 2301 of the table, it is determined that the same license file has already been installed, and thus the process is terminated without performing installation.

If it is permitted to install the same license file two or more times, licensed users can freely extend the validated period indicated by the ValidatedPeriod attribute, that is, the period during which the application is allowed to be used, and can increase the additional number of times that the application is allowed to perform printing, wherein the additional number of times is indicated by the AdditionalPrint attribute. The purpose of step S2204 is to prevent such extension or increase.

In the next step S2205, it is determined whether the license file is valid by comparing the value of the ApplicationKey attribute described in the license file shown in FIG. 20 with the decryption key that is stored when the application is successfully installed. The already-installed application keys can be found in an application key table, such as that shown in FIG. 24, stored in the multifunction apparatus 100. If the value of the ApplicationID attribute of the license file shown in FIG. 20 is not included in a column 2401 of the application key table, or if a corresponding application key 2402 is not equal to the value of the ApplicationKey attribute described in the license file although the value of the ApplicationID attribute of the license file is included in the column 2401 of the application key table, it is determined that the license file is not valid, and the process is terminated without performing installation.

In the next step S2206, the expiration date is set by rewriting a value, described in a field in a column of "expiration date" (2403) in the application key table shown in FIG. 24 and in a row corresponding to the ApplicationID attribute of the license file with a value of the ValidatePeriod attribute described in the license file. In the case in which the expiration date has already been set, the value of the ValidatedPeriod attribute is added to the current expiration date, and the resultant date is employed as the new expiration date. However, in the case in which the expiration date has not been set, the value of the ValidatedPeriod attribute is added to the present date, and the resultant date is employed as the expiration date.

In the next step S2208, a counter number is determined which corresponds to the application ID and to which an upper limit is to be set. The determination of the counter number is performed using the counter number/application ID table shown in FIG. 4 in a similar manner as in steps S603, S604, S607, and S608 shown in FIG. 6. Thereafter, in the counter upper limit table shown in FIG. 19, values in a row assigned to the determined counter number are written on the basis of the values of the MaxCopy attribute, the AdditionalPrint attribute, and the AdditionalScan attribute described in the license file shown in FIG. 20. Herein, in the case in which an attribute indicates the upper limit (maximum allowable number of operations) as is the case with the MaxCopy attribute, the value described in the attribute is directly written in the counter upper limit table. However, in the case in which an attribute indicates an increment as is the case with the AdditionalPrint attribute and the AdditionalScan attribute, the sum of the current upper limit and the value of the attribute is calculated, and the resultant sum indicating a new upper limit is written in the counter upper limit table.

Finally, in step S2209, the value of the license file ID attribute and the expiration date of the license file are written in the license file ID table shown in FIG. 23, and the process is ended. Herein, the license file ID and the expiration date are written in a record newly created in the license file ID table.

As described above, in the multifunction apparatus that is a typical example of the peripheral device having the capability of managing the amount of allowed usage of a program executable on the multifunction apparatus or the amount of allowed usage of a function of the multifunction apparatus such as a printing function or a scanning function, a management program is stored in the external HD of the multifunction apparatus whereby license identification information (license file ID) identifying a license file, which is an example of license information, and a license file indicating an amount of change in right of usage of a program are acquired from the outside via the network interface, and license file IDs corresponding to existing license files are managed. It is determined whether the same license file ID as that of the acquired license file is included in the existing license file IDs managed in the multifunction apparatus. If the same license file ID is found, the already-installed right of usage of the program managed by the management program on the multifunction apparatus is changed by an amount equal to a change in the right of usage managed by the management program. For example, the license management program stored in the external HD manages the expiration-date-of-installation information indicating a period during which a license file acquired by multifunction apparatus via the network interface is valid. The license management program also authenticates the expiration date of installation of the license file and manages an encryption key of an already-installed program code together with an application ID identifying the program. The license file may be encrypted using an encryption key uniquely assigned to the multifunction apparatus, and the multifunction apparatus may include a program for decrypting the encrypted license file. The management program may change the right of usage such that if the amount of change in license information described in the license file acquired via the network interface indicates an increment in right of usage, the management program increases the already-installed right of usage of the program by an amount specified in the acquired license file, while, if the amount of change in license information described in the license file acquired via the network interface indicates a decrement in right of usage, the management program reduces the already-installed right of usage of the program by an amount specified in the acquired license file. The management program may manage license files as certification information, and the management program may deal with license files as valuables that certify the right of a particular amount of usage of a program installed on the peripheral device or a function of the multifunction apparatus. Herein, the "right of usage" refers to a right to use a particular function of the multifunction apparatus, such as a facsimile function, a printing function, a copying function, a scanning function, a color printing function, or a stapling function, or a right to use photography-quality paper, ink or toner. For example, in the case of the scanning function, the right of usage includes information in the form of numerals or codes indicating the numbers of times that scanning and copying are allowed to be performed. In the case of the photographic-quality paper, the number of sheets of photographic-quality paper allowed to be used is expressed. On the other hand, in the case of ink, the amount of ink allowed to be used is expressed. The information indicating the right to use a program includes information indicating a time during which the program is allowed to be executed or the number of times that the program is allowed to be executed. A right of usage for a combination of a program a function may be described in the license file. For example, a right of usage for a combination of the scanning function and the OCR program may be expressed by specifying the allowed number of operation or the allowed usage time, and the right of usage may be described in the license file.

FIG. 23 shows the license file ID table stored in the multifunction apparatus 100. In the license file ID table, a plurality of records each including a set of a license file ID (2301) and an expiration date of installation (2302) are described. A new record is added via the process shown in FIG. 22. The core 10 of the multifunction apparatus 100 checks the license file ID table at scheduled intervals. If the core 10 detects a record whose expiration date of installation has already been reached, the core 10 deletes the detected record and makes it reusable. This prevents the license file ID data from expanding without any restriction.

Although in the present embodiment, records whose expiration date of installation has already been reached are deleted from the license file ID table thereby preventing the number of license file IDs from increasing, the expiration date of installation may not be described in the license file ID table and license file IDs of installed license files may be stored for an indefinite period. In this case, there is a possibility that the size of the license file ID table reaches a predetermined value. A problem that will occur when the size of the license file ID table reaches the predetermined value can be avoided by providing means for disabling or limiting further installation of license files when the size of the license file ID table reaches the predetermined value.

FIG. 24 shows an application key table stored in the multifunction apparatus 100. The application key table includes a plurality of records each representing a set of an application ID (2401), an application key (2402), and an expiration date of the application (2403). When an application is installed, a new record is created in the application key table. If an encrypted application is successfully installed, an application key used in decryption is stored together with an application ID in the newly created record. When an application is uninstalled, a corresponding record is deleted.

Thus, a license issuer can manage the amounts of usage of applications on the device-by-device basis by issuing licenses thereby managing the upper limits of the amounts of usage of applications in the above-described manner. Furthermore, by managing license files in which license file IDs are described, duplicated installation of a license is prevented, while allowing incrementing the allowed number of operations of applications on the basis of values specified in license files. This makes it possible for the license issuer to issue licenses without having to manage the maximum allowable amount of usage of applications for respective devices.

Figure 25:
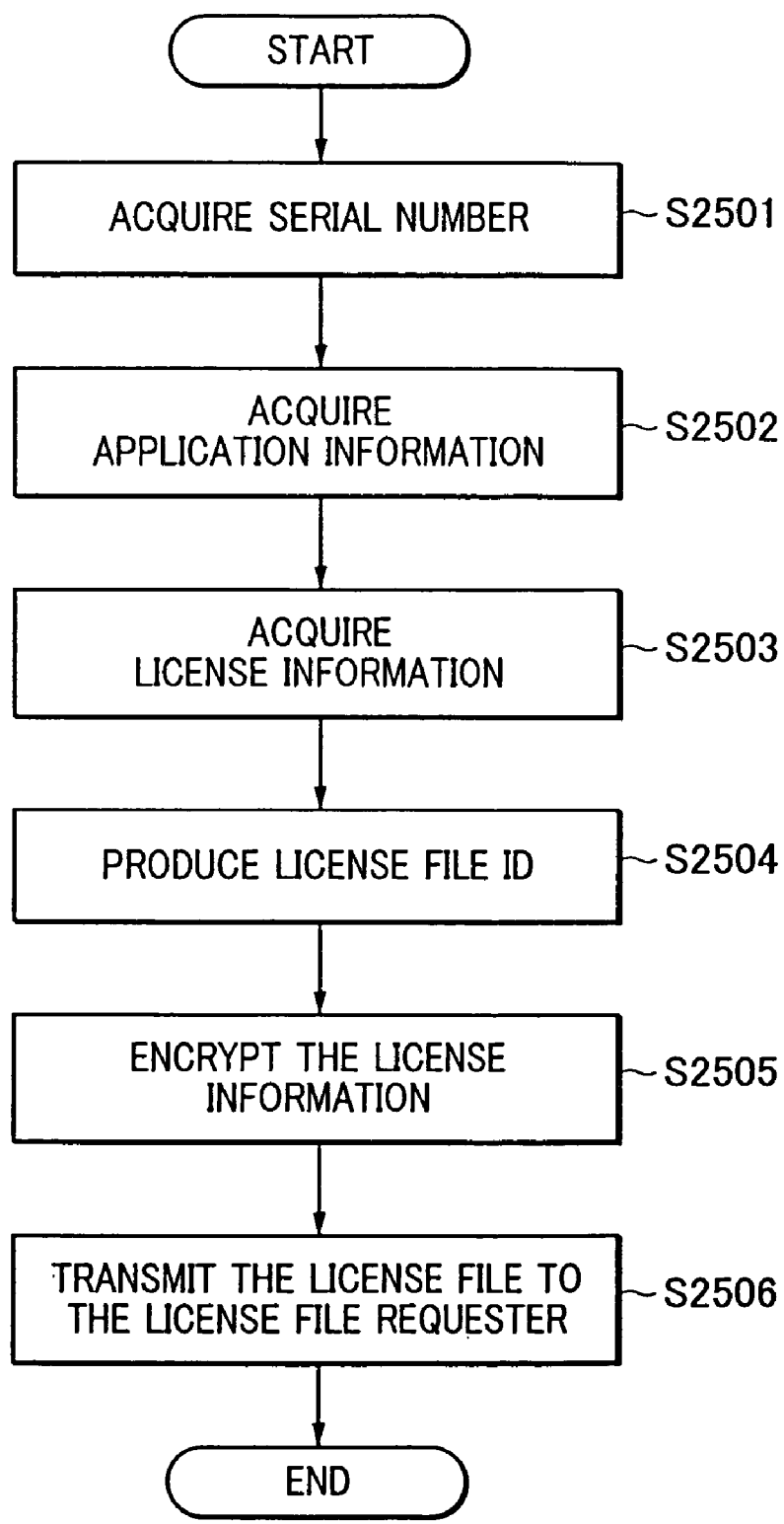
FIG. 25 is a flow chart showing a process of getting back an application.
Figure 26:
FIGS. 26A and 26B are diagrams showing examples of Web pages for getting back a license file.

Referring to FIGS. 25 and 26, a technique of taking back a license held in the multifunction apparatus 100 by issuing a return-back license file is described below. A command to take back a license file is issued to the multifunction apparatus 100 via a Web browser running on the host computer (11, 23, or 13) or another multifunction apparatus (not shown) connected to the multifunction apparatus 100 via a network. An example of a browser screen is shown in FIG. 26.

In an alternative embodiment, the multifunction apparatus 100 has the electronic mail transmission/reception capability, and the host computer or another multifunction apparatus connected to the multifunction apparatus 100 via the network issues a command to the multifunction apparatus 100 via electronic mail. In response, the multifunction apparatus 100 produces a return-back license file and returns it as a file attached to an electronic mail.

In an alternative embodiment, the multifunction apparatus 100 has the capability of interpreting a command set to produce a return-back license file. In response to receiving a command to produce a return-back license file from the host computer or another multifunction apparatus connected to the multifunction apparatus 100 via the network, the multifunction apparatus 100 interprets the command and produces a return-back license file according to the command. The resultant license file is transmitted to the host computer or the like. FIGS. 25 and 26 show a process of taking back a license from the multifunction apparatus 100 by issuing a return-back license file, in response to a command to produce a return-back license file via the Web browser shown in FIG. 26 via an electronic mail or in response to a command set to produce a return-back license file. The process shown in FIG. 25 is executed on the multifunction apparatus 100.

In step S2501, a serial number of a device that will use a produced return-back license file is acquired. The serial number is described in a license take-back command. In a case in which a return-back license file is produced such that the resultant return-back license file cannot be used not only by any other devices but also by the device that produces the return-back license file, an invalid value (such as 1) is used as the serial number. In the case in which the Web page shown in FIG. 26 is used, a serial number of 1 is used when a refund button 2602 is selected, while a serial number input via a text input field 2604 is used when a transfer button 2603 is selected.

In the next step S2502, application information necessary in producing the license file is acquired. Herein, the necessary information includes the application ID, the application key, and the expiration date. The application ID is included in the license file take back command. In the case of the Web page screen shown in FIG. 26, the application names of the currently installed applications and their application IDs are displayed in the form of a list in a field 2601 so that a license file will be produced for an application selected from the list. After acquiring the application ID, the application key table shown in FIG. 24 is searched to detect an application key (2402) corresponding to the acquired application ID. Furthermore, an expiration date (2403) corresponding to the acquired application ID is detected, and the validated period is calculated on the basis of the expiration date and the present date. Furthermore, the expiration date is set on the basis of the present date. The user interface shown in FIG. 26 may be displayed on the operation control unit (FIG. 14) of the multifunction apparatus 100.

In the next step S2503, license information associated with the application ID is acquired. First, a counter number is determined which corresponds to the application ID and to which an upper limit is to be set. The determination of the counter number is performed using the counter number/application ID table shown in FIG. 4 in a similar manner as in steps S603, S604, S607, and S608 shown in FIG. 6. After determining the counter number, the current values and the upper limits of copying, printing, and scanning operations are detected from the counter table shown in FIG. 7 and the counter upper limit table shown in FIG. 19, and the remaining allowable numbers of operations are determined by calculating the differences between the upper limits and the current values. The calculated values are employed as the values of the AdditioalCopy, AdditionlPrint, and AdditonalScan attributes. Furthermore, in order to invalidate the license of the application to the multifunction apparatus 100, the current values of the counters in the counter table shown in FIG. 7 are replaced with the upper limits of the corresponding counters in the counter upper limit table shown in FIG. 19.

In the next step S2504, a license file ID is produced in a similar manner as in step S2101 shown in FIG. 21. However, in this step S2504, the physical address possessed by the multifunction apparatus 100 performing the process shown in FIG. 25 is employed.

If all license information necessary in producing the license file is obtained via the above-described steps, then, in step S2505, the license information is encrypted. The period of validity of installation of the license file is set to a fixed value (for example, one year after the present date). The encryption is performed by means of public key cryptography using a public key corresponding to a private key possessed by the multifunction apparatus to which the license file is to be transmitted. In the case in which all multifunction apparatuses have the same private key, a private key possessed by the multifunction apparatus 100 can be used as the private key. Alternatively, the license file may be encrypted by means of common key cryptography using the private key possessed by the multifunction apparatus to which the license file is to be transmitted.

In the next step S2506, the license file is produced and transmitted to the issuer of the license file take back command. Thereafter, the process is ended. In the case of the Web page shown in FIG. 26, a new Web page (2607) including an icon (2608) representing the license file is displayed on the browser thereby prompting a user to download the license file. In response to clicking on the icon (2608), the license file is transmitted.

FIG. 26A shows an example of a Web page via which a license file take back command is issued. The Web page is displayed on a Web browser displayed on the host computer (11) connected to the multifunction apparatus 100 via a network. On the Web page 2600, an application ID of an application is specified in a field 2601. Buttons 2602 and 2603 are used to exclusively select whether the license file is to be refunded or transferred to another device. In the case in which transferring to another device is selected, a serial number of a device to which the license file is transferred is input in a text input field 2604.

If a OK button 2605 is pressed after completion of setting all items, the process described above with reference to FIG. 25 is performed by the multifunction apparatus 100. If the license file is produced, the Web page 2607 is displayed to prompt a user to download the produced license file. If the icon (2608) representing the license file is clicked on, the license file is downloaded and stored.

As described above, the capability of taking back a license from a device by issuing a return-back license file makes it possible to transfer a license from a device to another device. Furthermore, it becomes possible to distribute license files as valuables. A license file can be taken back in the form that does not allow the resultant license file to be reinstalled into any device. If this license file is returned back to the issuer of the original license file, the issuer of the original license file can recognize that the user of the application will not further use the application. Licenses installed in a plurality of devices can be automatically redistributed depending on the license usage status of respective devices, as described below with reference to FIGS. 27 to 29.

Figure 27:
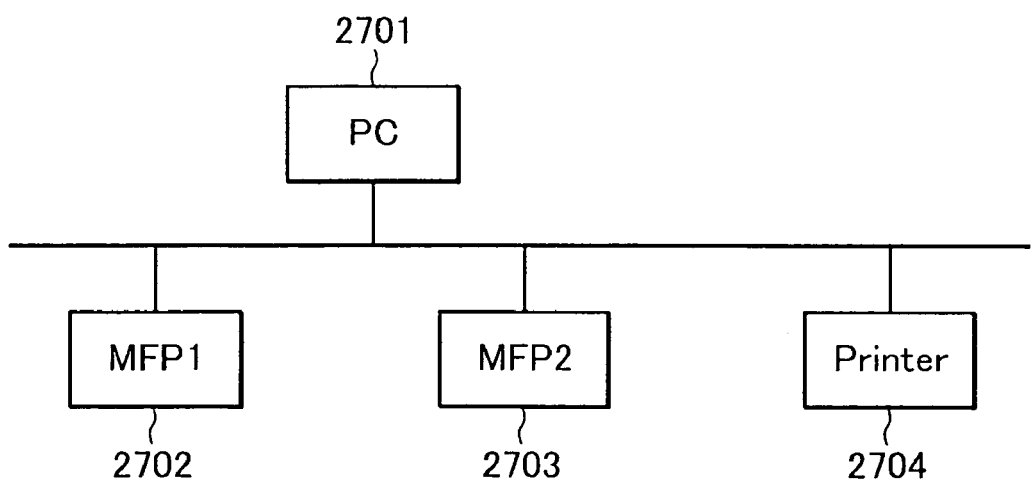
FIG. 27 is a block diagram showing a system in which all licenses are managed at one location and licenses are automatically distributed.

FIG. 27 shows a system according to the present embodiment of the invention.

As shown in FIG. 27, a host computer 2701, which is a preferred example of the management apparatus according to the present invention, is connected via a network to a first multifunction apparatus 2702, a second multifunction apparatus 2703, and a printer 2704, which are preferred examples of image forming apparatuses. The host computer 2701 and other devices such as the first multifunction apparatus 2702 each have a network board (communication control means), and the devices transmit/receive various data and programs to/from each other via the network boards. Although in the present embodiment, the host computer 2701 serves as the management apparatus, a controller or a control board disposed in one of other devices such as the second multifunction apparatus 2702 may serve as the management apparatus.

Figure 39:
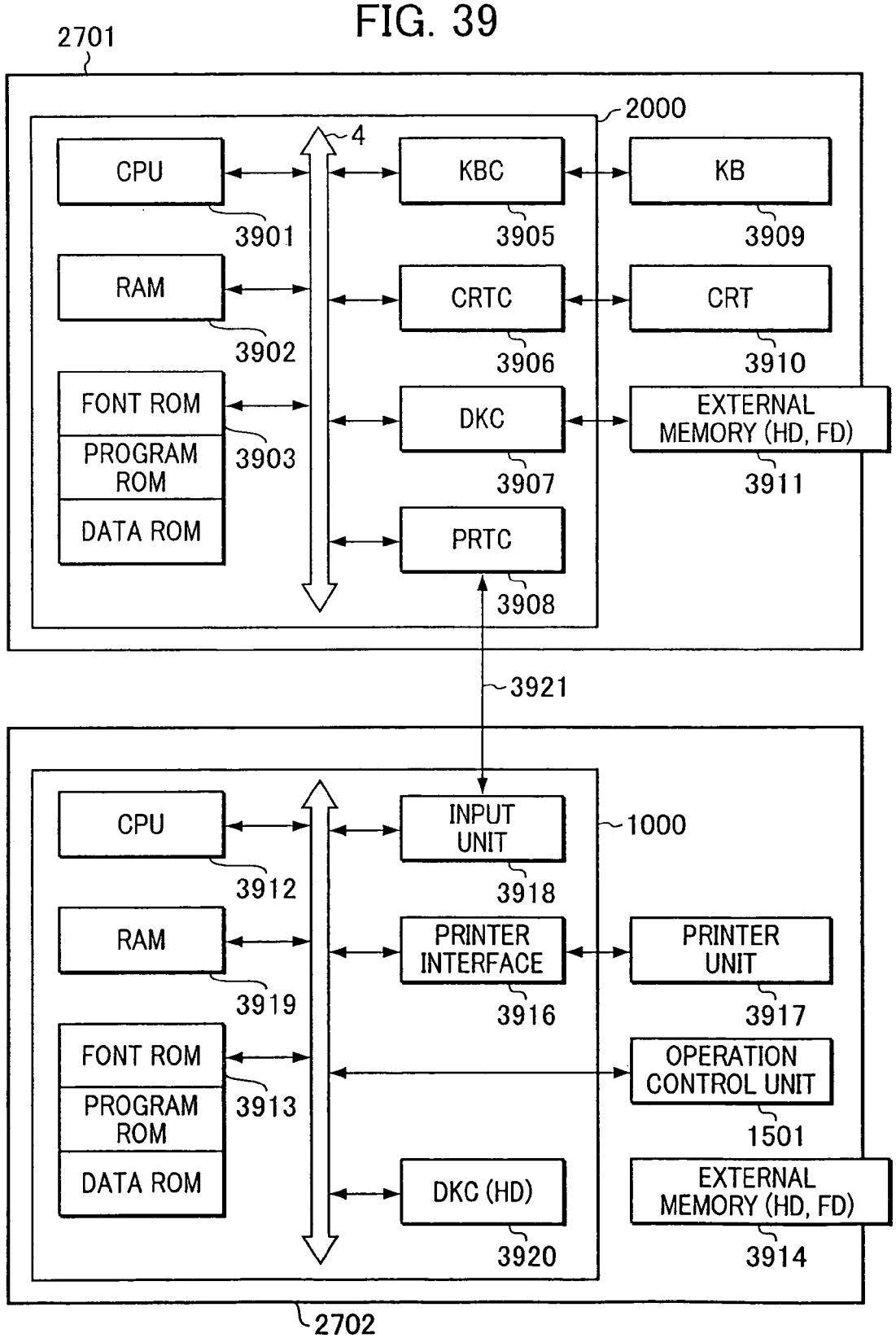
FIG. 39 is a block diagram showing a printer control system including a computer, according to an embodiment of the present invention.

A host computer 3000 (corresponding to the personal computer 2701 shown in FIG. 27) serving as an information processing apparatus according to an embodiment of the present invention is described below. FIG. 39 is a block diagram showing a printer control system including a computer, according to the present embodiment. Note that the present invention can be applied to a single device, a system including a plurality of device placed at the same location, or a system including a plurality of devices connected via a network such as a LAN or WAN, as long as the device or the system has the functions according to the invention. The multifunction apparatus 2702 is similar to the multifunction apparatus 2702 shown in FIG. 27. Although there are other multifunction apparatuses connected to the host computer 3000 via the network 3921, they are not shown in FIG. 39.

In FIG. 39, the host computer 3000 includes a CPU 3901 for processing a document including graphics, images, characters, tables (such as a spreadsheet), etc., according to a document processing program stored in a program ROM in a ROM 3903 or an external memory 391. The CPU 3901 is also responsible for generally controlling devices connected to a system bus 3904. Programs for executing the processes described above with reference to FIGS. 21, 28, 32, 33, 35, and 37 are stored in the external memory 3911, and the CPU 3901 loads necessary programs from the external memory 3911 into a RAM 3902 and executes them.

In the printer, programs for executing the processes described above with reference to FIGS. 18, 22, 28, 32, 35, and 37 are stored in an external memory 3914, and a CPU 3912 of the printer 3912 loads necessary programs from the external memory 3914 into a RAM 3919 and execute them. That is, devices such as a printer or a copier 2702 may also serve as a server or a host computer.

In the program ROM of the ROM 3903 or in the external memory 3911, an operating system (OS) program serving as a control program for controlling the CPU 3901 is stored. Font data used in processing of documents is stored in a font ROM of the ROM 3903 or in the external memory 3911. Various kinds of data used in processing of documents are stored in a data ROM of the ROM 3903 or in the external memory 3911. A scanner unit controller 3921 reads a document via an optical system and stores obtained document data in the form of electronic data in a HD 3920. The document data may also be output to a printer unit 3917.

The RAM 3902 serves as a main memory or a work area used by the CPU 3901. A keyboard controller (KBC) 3905 controls inputting of data via a keyboard 3909 or a pointing device (not shown). A CRT controller (CRTC) 3906 controls displaying of data on a CRT display 3910. A disk controller (DKC) 3907 controls accessing to the external memory 11 such as a hard disk (HD) or a floppy disk (FD) in which a boot program, various applications, font data, a user file, an editing file, and/or a printer control command generation program (printer driver) are stored.

A printer controller (PRTC) 3908 is connected to the multifunction apparatus 2702 via a bidirectional interface 3921 and is responsible for controlling communication with the multifunction apparatus 2702. The CPU 3901 converts (rasterizes) display data into the form of outline font data and stores the resultant data in a display information RAM constructed in the RAM 3902. This makes it possible to display data on the CRT 3910 in the WYSIWYG fashion.

In response to clicking an icon or the like with a mouse cursor (not shown) on a CRT 3910, the CPU 3901 opens a corresponding window and performs various data processing. When a user wants to print data, the user may open a print setting window and may set the printer, the printer driver, and/or printing conditions such as a printing mode.

In the multifunction apparatus 2702, the printer CPU 3912 outputs an image signal as output information to the printer engine 3917 connected to the system bus 3915, in accordance with the control program stored in the program ROM of the ROM 3913 or in the external memory 3914.

In the program ROM of the ROM 3913, the control program for controlling the CPU 3912 is also stored. In the font ROM of the ROM 3913, font data used in producing output information is stored. In the case in which the printer does not have the external memory 3914 such as a hard disk, information used on the host computer is also stored in the data ROM of the ROM 3913.

The CPU 3912 is capable of communicating with the host computer via the input unit 3918. This allows information to be transmitted from the printer to the host computer 3000. The RAM 3919 is used as a main memory or a work area by the CPU 3912. The memory capacity of the RAM 3919 can be increased by connecting an optional RAM to an extension port. The RAM 3919 is used as an output information storage area, an environmental data storage area, and a NVRAM. Accessing to the external memory 14 such as the hard disk (HD) or the IC card is controlled by a memory controller (MC) 3920.

The external 3914 is optionally connected to the multifunction apparatus 2702, to store font data, an emulation program, form data, etc. The operation control panel 1501 includes switches and LED indicators. The number of external memories is not limited to one, but two or more external memories may be connected to the multifunction apparatus 2702, to store optional font data in additional to standard font data, and or a program for interpreting various printer control languages. Furthermore, there may be provided a NVRAM (not shown) for storing printer mode setting information received from the operation control panel 1501.

Figure 28:
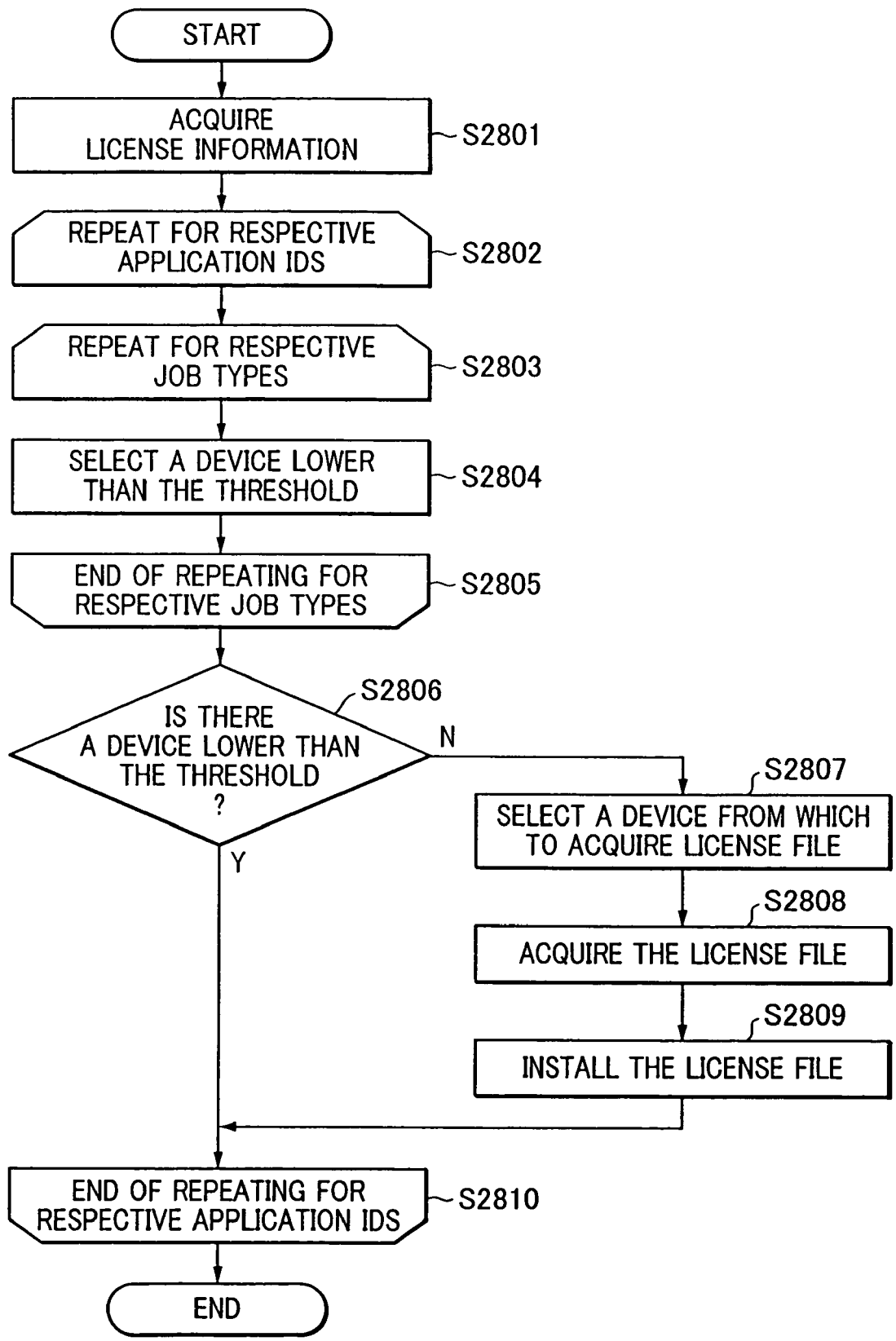
FIG. 28 is a flow chart showing a process of automatically distributing licenses.

FIG. 28 is a flow chart showing a process of redistributing licenses. This process may be executed on the host computer (2701) or a multifunction apparatus (2702 or 2703) or a printer (2704). In the case in which the process shown in FIG. 28 is executed on a multifunction apparatus or a printer, the host computer (2701) shown in FIG. 27 is not necessary.

The process shown in FIG. 28 is performed at scheduled intervals (for example, once every day or every hour) or at scheduled times.

First in step S2801, a license usage status information including information indicating the remaining amount of usage right of an application is acquired from a peripheral device. To acquire the license usage status information, a license usage status request command is transmitted to a device. In response, the license usage status information is transmitted from the device. More specifically, if the device receives the license usage status request command, the device determines the number of operations allowed to be further performed, for each application ID and for each job, by calculating the differences between values described in the counter upper limit table shown in FIG. 19 and values described in the counter table shown in FIG. 7, wherein the number of operations allowed to be further performed is a typical example of information indicating remaining amount of right of usage of the application, stored in the peripheral device. On the basis of the number of further allowed operations, received from each device, a license usage status table indicating the license usage status of each device for each application ID is produced as shown in FIG. 29 by the host computer or the device that is performing the process shown in FIG. 28.

Steps S2802 to S2810 are performed repeatedly for respective application IDs acquired in step S2801.

Steps S2803 to S2805 are performed repeatedly for respective job types. At step S2804 in this loop, if a device is detected which has a number of further allowed operations of a particular job type smaller than a predetermined threshold (for example, 100), the device identifier is temporarily stored.

In step S2806, it is checked whether there is a device detected in step S2804. If there is no such device, then in step S2810 the process for the current application ID is ended. If there is more application IDs to be examined, the process returns to step S2802 to perform the process for a next application ID. In step S2804 described above, a device may be detected which is smaller than a threshold in terms of the number of times that operation is allowed to be further performed, for each function of the multifunction apparatus used by an application. In the case in which rights of use are set to respective applications independently of devices, a device may be detected which is smaller than a threshold in terms of the number of times that operation is allowed to be further performed, for each application.

In the case in which it is determined in step S2806 that there is one or more devices detected in step S2804, the process proceeds to step S2807. In step S2807, devices are selected from which to take back license files. More specifically, the selection is performed as follows. In the license usage status table shown in FIG. 29, of those job types in which all numbers of times of allowed operations are not equal to 0 (that is, of those job types that can be executed by the current application ID), the numbers of times of allowed operations is sorted in descending order for a job type in the leftmost column, and as many devices as there are devices detected in step S2804 are selected in descending order. This causes licenses to be taken back from a group of devices that are least in the amount of usage of the application.

As described above, on the basis of information indicating the number of times that operation is allowed to be further performed, which is an example of information indicating the remaining amount of right of usage acquired by the management program on the host computer 3000, peripheral devices that are greater in the remaining amount of right of usage than a particular value and peripheral devices that are smaller in the remaining amount of right of usage than the particular value are detected, and rights of usage are redistributed by redistributing license files, each of which is a typical example of license information (right-of-usage certificate), among the peripheral devices described above so that the difference in remaining amount of right of usage among the peripheral devices described above is minimized. In alternative embodiment, the order in which licenses are taken back from devices is determined in advance, and devices are selected in the predetermined order. For example, when there are ten peripheral devices that are sorted in the descending order in terms of the remaining amount of right of usage, the host computer may regard first five peripheral devices as peripheral devices that are higher than the threshold and may regard the other five peripheral devices as peripheral devices that are lower than the threshold. For example, when a OCR application is executed on peripheral devices having a scanning function, if a user A has license files for managing ten peripheral devices on which the OCR application is executed using the scanning function, information indicating the remaining amount of right of usage is collected from those ten peripheral devices. If the sum of the remaining amounts of right of usage of the ten peripheral devices is equal to, for example, 120, the licenses may be redistributed such that the resultant remaining amount of right of usage of each peripheral device becomes equal to 12 that is the quotient obtained by dividing the total remaining amount of right of usage, 120, by the number of peripheral devices, 10. The redistribution may be performed for devices selected according to a particular function such as the printing function or the scanning function, or license files may be redistributed for all functions. In the latter case, rights of usage of applications may or may not be redistributed at the same time. Alternatively, rights of usage of applications and rights of usage of functions such as the printing function, the scanning function, and the facsimile function provided by peripheral devices are managed, and the distribution means may be set such that either rights of usage of applications or rights of usage of functions may be redistributed.

In the next step S2808, license files associated with the current application ID are collected from the devices selected in step S2808. The collection of license files is performed by transmitting license file product command including data specifying the application ID to the selected devices and receiving license files that are returned from the selected devices in response to the command. If the devices receive the license file product command, they produce license files according to the flow shown in FIG. 25.

In the next step S2809, the license files collected in step S2808 are reinstalled into the devices selected in step S2804. Herein, the host computer 3000 updates the license database by performing the process shown in FIG. 37. In step S2801, the process for the current application ID is ended. If there are more applications IDs to be examined, the process returns to step S2802 to perform the above-described process for a next application ID. If there is no such application ID, the process is ended.

FIG. 29 shows an example of the license usage status table indicating the license usage status for each application ID, produced in step S2801 shown in FIG. 28 on the basis of information supplied from each device in the system. Note that as many license usage status tables as there are application IDs are produced in the host computer or the device that performs the process shown in FIG. 28.

In a column 2901, network names of respective devices in the system are described. In a column 2902, network addresses of respective devices in the system are described. In a column 2903, the number of copying operations allowed to be further performed is described for each device in the system. In a column 2904, described is the number of times that printing operation is allowed to be further performed by each device for the particular application ID. In a column 2905, described is the number of times that scanning operation is allowed to be further performed by each device for the particular application ID. In this example, the number of further allowed scanning operations is set to 0 in column 2905, because the application having the application ID corresponding to this table does not need to perform scanning operations.

As described above, in the network system in which the plurality of devices are allowed to execute applications within limits defined by licenses, the usage efficiency of applications in the network system can be maximized by transferring licenses from a group of devices that are least in the amount of usage of applications to a group of devices that are greatest in the amount of usage of applications.

All licenses may be managed at the same location and licenses may be dynamically downloaded into devices when applications are started, as described below with reference to FIG. 27 and FIGS. 30 to 34.

FIG. 27 shows a system configuration according to the present embodiment of the invention. As shown in FIG. 27, a host computer 2701 is connected to a first multifunction apparatus 2702, a second multifunction apparatus 2703, and a printer 2704 via a network. All licenses are managed by the host computer 2701. The first multifunction apparatus 2702, the second multifunction apparatus 2703, and the printer 2704 request the host computer 2701 to provide a license when a user starts to use an application. When the user ends the usage of the application, the license is returned to the host computer 2701 (similar to the host computer 3000).

Figure 30:
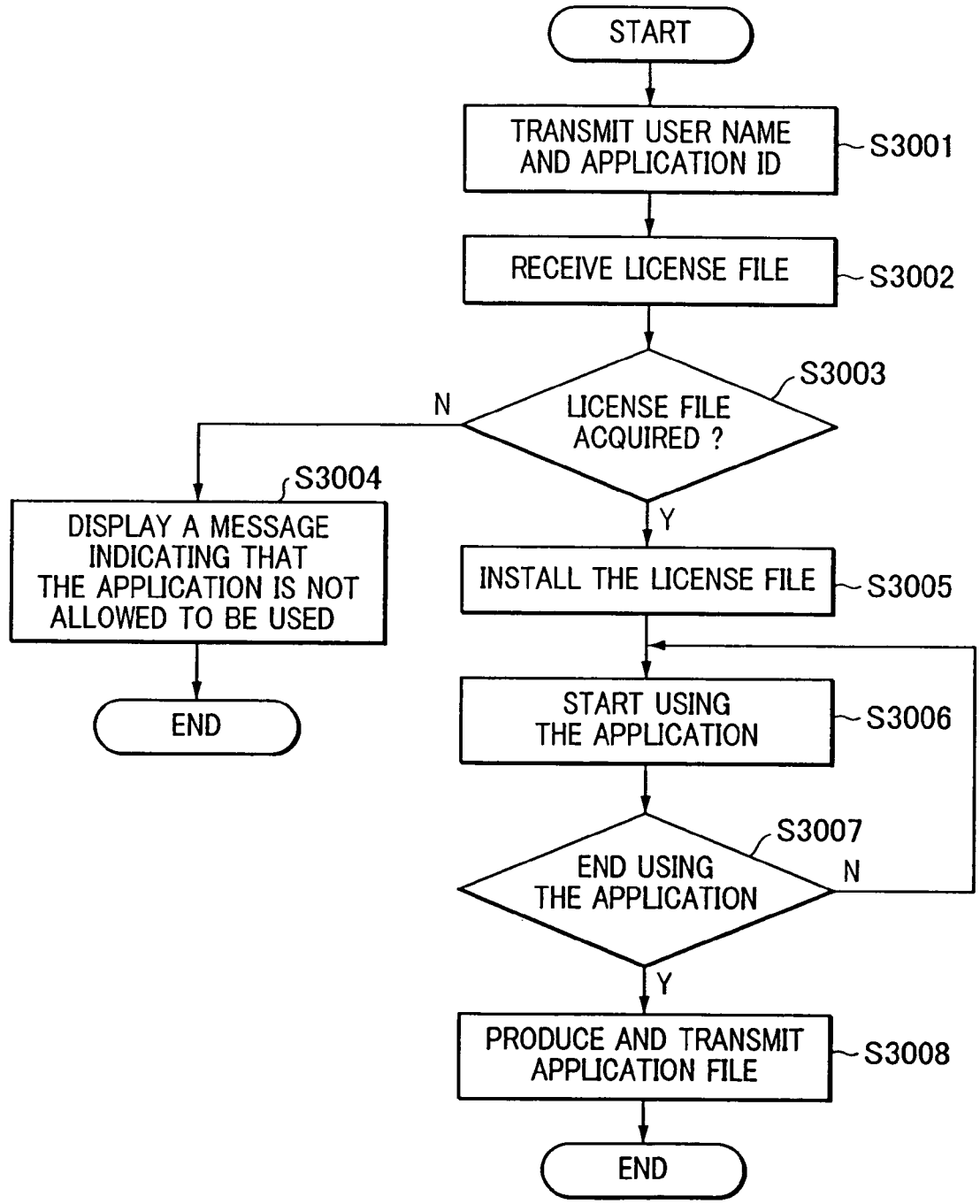
FIG. 30 is a flow chart showing a process of issuing a license request, performed by a device, in an automatic license distribution process.

FIG. 30 shows a process performed by the first multifunction apparatus 2702 or the second multifunction apparatus 2703 to request the host computer 2701 to provide a license. This process is started when a user issues an application start command via the operation control unit 14 shown in FIG. 1.

Figure 31A:
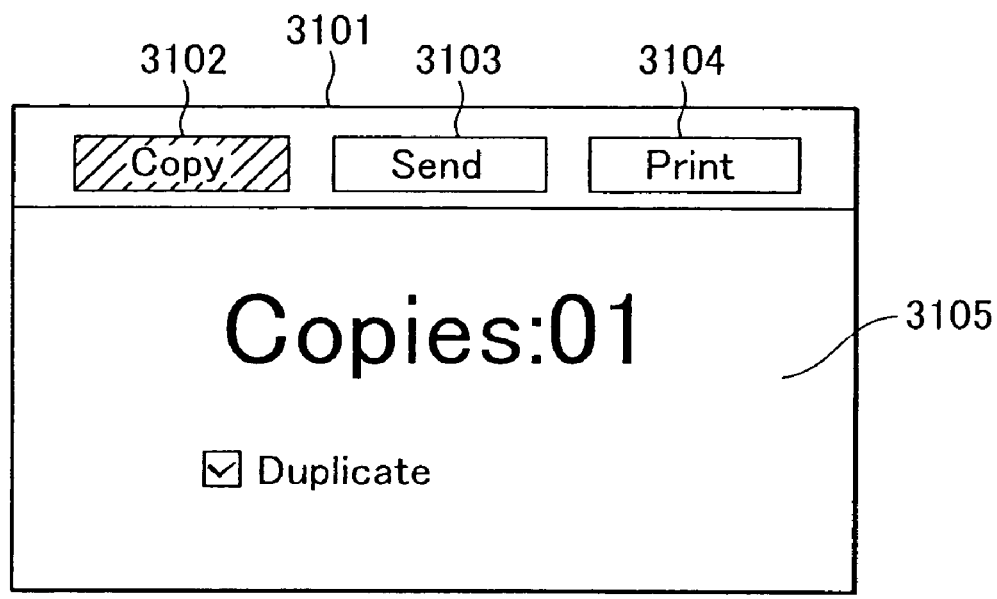
FIG. 31A is a diagram showing an example of an application control screen.
Figure 31B:
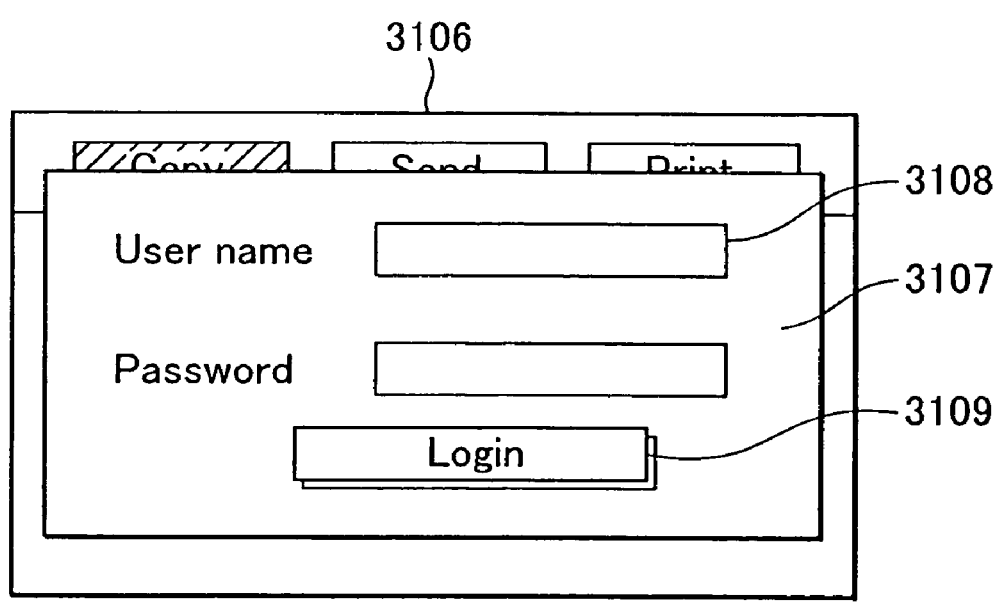
FIG. 31B is a diagram showing an example of a login screen.

On the operation control unit 14, a login screen 3106 such as that shown in FIG. 31B or an application control screen 3101 such as that shown in FIG. 31A are displayed. When a login dialog 3107 is displayed, a user inputs a user name in a user name field 3108 and clicks a OK button 3109. If login is successfully performed, the login dialog 3107 is closed and a specified application is started. Immediately before starting the application, the process shown in FIG. 30 is performed. When the application control screen 3101 is displayed, if a user clicks a button (3102 or 3103) to switch the application, the specified application is started. Also in this case, the process shown in FIG. 30 is performed immediately before the application is started, parameters indicating the use name and the application ID are transferred to the process.

In step S3001, a license file request command including parameters indicating a user name, an application ID of an application to be used, and a serial number of a device that is performing the process shown in FIG. 30 is transmitted to the host computer 2701 to request the host computer 2701 to issue a license file. In response to receiving the request, the host computer 2701 starts a process shown in FIG. 32. In step S3002, a response, which is expected to include a license file transmitted from the host computer 2701, is received.

In step S3003, it is checked whether the response from the host computer 2701 includes the license file. If the response does not include the license file, because of, for example, occurrence of an error, the process proceeds to step S3004. In step S3004, a dialog is displayed on the operation control unit 14 to notify that the application cannot be used. More specifically, in this step S3004, an error code is examined, and if the error code indicates that the license file was not issued because a user does not have a right to use the application, a message indicating that the user does not have the right to use the application is displayed on the operation control unit 14.

If it is determined in step S3003 that the response includes the license file, the process proceeds to step S3005. In step S3005, the received license file is installed. The installation of the license file is performed via the process shown in FIG. 22.

In step S3006, after completion of installing the license file, the application is started so that the user can use the application. When the application is being used, the process shown in FIG. 18 is performed, during which, if the counter value reaches an upper limit defined in the license file, the application is forcedly terminated and a message is displayed to inform that the application is not allowed to be further used.

In step S3007, it is determined at scheduled intervals whether the application has been ended in response to logout or switching of the application. If it is determined that the application has been ended, the process proceeds to step S3008. In step S3008, a license file to be returned is produced. The produced license file is transmitted together with a license file return command to the host computer 2701. Thereafter, the process is ended. The production, in step S3008, of the license file to be returned is performed according to the flow shown in FIG. 25. However, encryption is performed using the private key possessed by the host computer 2701 to which the license file is to be returned. The license file transmitted to the host computer 2701 in step S3008 is processed by the host computer 2701 according to the flow shown in FIG. 33.

Figure 32:
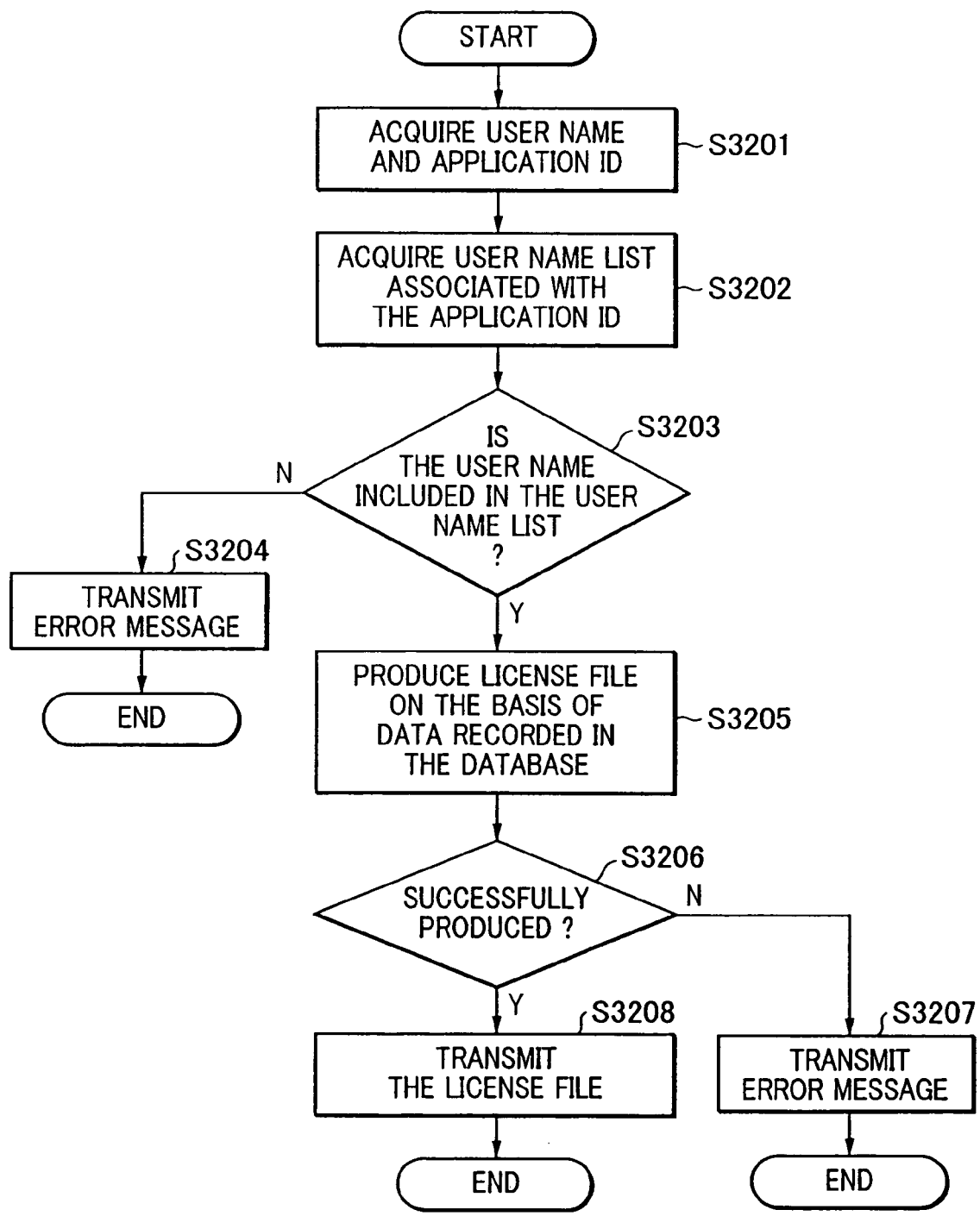
FIG. 32 is a flow chart showing a process of issuing a license, performed by a host device, in the automatic license distribution process.

FIG. 32 shows a process of issuing a license file in response to receiving a license file request command issued by a device in step S3001 in FIG. 30. This process shown in FIG. 32 is performed on the host computer 2701.

In step S3201, a serial number of the device that has issued the request in step S3001 in FIG. 30, a user name, and an application ID are extracted from parameters described in the license request command.

In step S3202, an application license database shown in FIG. 34 is searched to detect a record including the same application ID as the extracted application ID, and a list of users 3402 is extracted from the record. In step S3203, it is checked whether the user name extracted in step S3201 is included in the extracted list of names. If the list does not include the user name, the process proceeds to step S3204. In step S3204, an error massage is returned to the device that is the issuer of the license request command.

If the list includes the user name, the process proceeds to step S3205. In step S3205, a license file is produced. The production of the license file is performed according to the flow shown in FIG. 21. However, license information is acquired from the application license database shown in FIG. 34. The number of allowed operations of each job type is given by an attribute (AdditionalPrint attribute, AdditionalScan attribute, AdditionalCopy attribute) indicating an increment from the current number of allowed operations. The number of times that the application is allowed to be performed is described in the license file for all applications detected from the database, and the numbers of times that the applications are allowed to be performed are temporarily set to 0 in the database so that issuing of a license of the same applications to another device is disabled thereby disabling the usage of the applications.

In step S3206, it is determined whether the license file has been produced. When the allowed number of times of operation is set to 0 in the application license database, or when no record including the same application ID as the requested application ID is found in the database, a license file is not produced. In this case, the process proceeds to step S3207, and an error message is returned to the device that is the issuer of the license request command. Thereafter, the process is ended.

In step S3208, the produced license file is returned to the device that is the issuer of the license request command. Thereafter, the process is ended.

As described above, by executing the program stored in the HD disposed in the multifunction apparatus 100, the amount of allowed usage of a particular function or program on the multifunction apparatus 100 is acquired. On the basis of the amount of allowed usage detected, a license file indicating the amount of usage of the function or the program allowed on the peripheral device is produced and transmitted to the device. Furthermore, an unique license file ID identifying the license file is produced and incorporated into the produced license file by means of addition, insertion, or rewriting. Preferably, an expiration date of the license file is also incorporated into the produced license file by means of addition, insertion, or rewriting. Furthermore, an encryption key of the program may be acquired, and the encryption key may be incorporated into the license file by means of addition, insertion, or rewriting. Furthermore, a value indicating the right of usage of a program corresponding to program identification information may be determined from the difference between the counter upper limit and the counter value corresponding to the application ID identifying the program, and the resultant value and the identification ID may be encrypted. The license file including the encrypted data is transmitted to the outside. The counter value is updated on the basis of the amount of right of usage corresponding to the transmitted license file.

Figure 33:
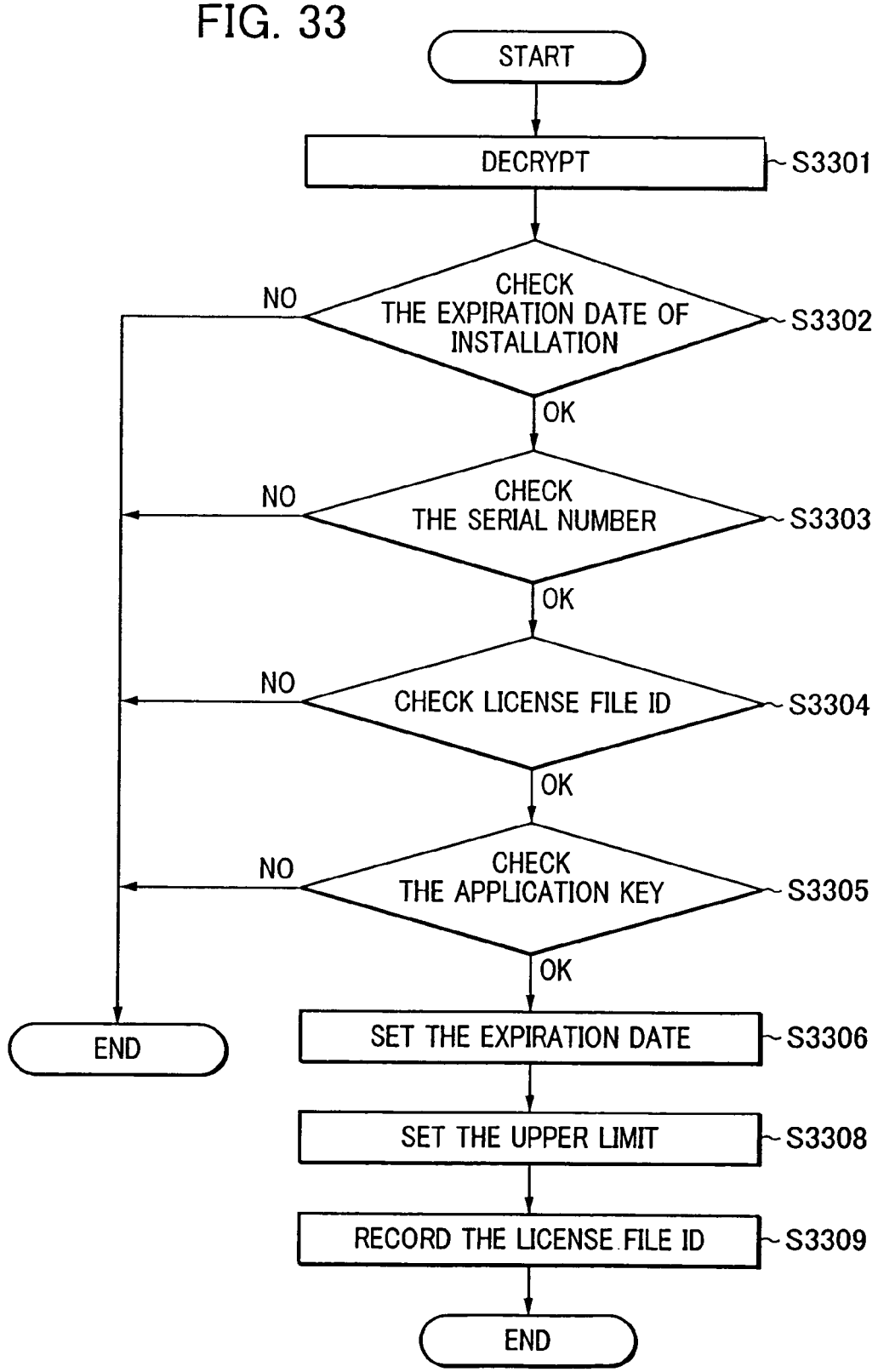
FIG. 33 is a flow chart showing a process of returning a license, performed by a device, in the automatic license distribution process.

FIG. 33 shows a process performed on the license return command including the returned license file transmitted in step S3008 shown in FIG. 30 to the host computer 2701. Herein, it is assumed that the host computer has the license file ID table shown in FIG. 24. The flow shown in FIG. 33 is applied not only when a license file returned from a device is rerecorded in the database but also when a license file produced via the process shown in FIG. 21 is installed on the host computer 2701.

In step S3301, the license file included in the license return back command is decrypted. The decryption is performed using the private key possessed by the host computer 2701 in accordance with the public key cryptography algorithm. In the case in which the common key is used in encryption, the decryption is performed using the private key possessed by the host computer 2701 in according with the common key cryptography algorithm.

In step S3302, the content of the decrypted license file is examined to detect the expiration date of installation. The detection of the expiration date of installation is performed by comparing the value of the ExpirationDate attribute described in the license file shown in FIG. 20 with the current date. If the current date is after the date indicated by the ExpirationDate attribute, the process is terminated without performing installation.

In the next step S3303, the serial number of the host computer 2701 is verified. The verification of the serial number is preformed by comparing the value of the DeviceSerialNo attribute described in the license file shown in FIG. 20 with the serial number possessed by the host computer 2701. If the serial number possessed by the host computer 2701 is not found in the DeviceSerialNo attribute, the process is terminated without performing the installation.

In the next step S3304, it is determined whether the same license file has already been installed. The determination is performed by comparing the value of the LicenseFileID described in the license file shown in FIG. 20 with License-FileID attributes of license files that have already been installed in the host computer 2701. The LicenseFileID attributes of already-installed license files can be found in a license file ID table, such as that shown in FIG. 23, stored in the host computer 2701. If the value of the LicenseFileID of the license file to be installed is included in a column 2301 of the table, it is determined that the same license file has already been installed, and thus the process is terminated without performing installation.

If it is permitted to install the same license file two or more times, licensed users can freely extend the validated period indicated by the ValidatedPeriod attribute, that is, the period during which the application is allowed to be used, and can increase the additional number of times that the application is allowed to perform printing, wherein the additional number of times is indicated by the AdditionalPrint attribute. The purpose of step S3304 is to prevent such extension or increase.

In the next step S3305, it is determined whether the license file is valid by comparing the value of the ApplicationKey attribute described in the license file shown in FIG. 20 with the values of the application keys 3408 described in the application license database (FIG. 34). If the value of the ApplicationID attribute described in the license file shown in FIG. 20 cannot found in the column 3401 of the table, or if a corresponding application key 3408 is not equal to the value of the ApplicationKey attribute described in the license file although the value of the ApplicationID attribute of the license file is included in the column 3401 of the application license database, it is determined that the license file is not valid, and the process is terminated without performing installation.

In the next step S3306, the expiration date is set by rewriting a value, described in a field in a column of "expiration date" (3403) of the application license database shown in FIG. 34 and in a row in which the corresponding ApplicationID attributes of the license file is described, with a value of the ValidatePeriod attribute described in the license file. In the case in which the expiration date has already been set, the value of the ValidatedPeriod attribute is added to the current expiration date, and the resultant date is employed as the new expiration date. However, in the case in which the expiration date has not been set, the value of the ValidatedPeriod attribute is added to the present date, and the resultant date is employed as the expiration date.

In the next step S3308, upper limits are assigned to the application ID by describing the values of the MaxCopy attribute, the AdditionalPrint attribute, and the AdditionalScan attribute in the license file shown in FIG. 20 into corresponding fields (3405, 3406, and 3407) in a record corresponding to the application ID in the application license database (FIG. 34). Herein, in the case in which an attribute indicates the upper limit (maximum allowable number of operations) as is the case with the MaxCopy attribute, the value described in the attribute is directly written in the counter upper limit table. However, in the case in which an attribute indicates an increment as is the case with the AdditionalPrint attribute and the AdditionalScan attribute, the sum of the current upper limit and the value of the attribute is calculated, and the resultant sum indicating a new upper limit is written in the counter upper limit table. In this step, the licenses returned in step S3008 shown in FIG. 30 from the device are redescribed in the license database.

Finally, in step S3309, the value of the license file ID attribute and the expiration date of the license file are described in the license file ID table shown in FIG. 23, and the process is ended. Herein, the license file ID and the expiration date are written in a record newly created in the license file ID table.

FIG. 34 shows an example of the application license database stored in the host computer 2701. License information associated with all applications executable in the network system shown in FIG. 27 is managed on this database. The database has a plurality of records in which application IDs are used as primary keys. Each record includes an application ID (3401), a list of user names of users who are allowed to use the application (3402), an expiration date of the application (3403), number of times that operations of applications are allowed to be performed (3405, 3406, and 3407), and an encryption key of the application (3408).

As described above, in the network system including a plurality of devices, all application licenses are managed by the host computer, licenses are given when users start to use applications, and remaining licenses are collected back when applications are ended, whereby all licenses of applications and rights of usage possessed by respective users are managed in the centralized fashion.

A license file for an application may be issued using a pre-issued license certificate, as described below with reference to FIGS. 35 and 36.

The license certificate is a certificate in which a license certificate number (ID) is described. A license certificate is sold to a user, in the form of a sheet of paper included in a package together with a storage medium such as a CD-R on which application code is stored. Only a license certificate may also be sold to a user.

A user who wants to use an application informs a license issuer of a serial number of a device on which the application is to be used, and a license certificate number (ID) included in a package via a facsimile, telephone, electronic mail, or other proper means. The license issuer produces a license file on the basis of the serial number and the license certificate number (ID). The produced license file is stored on a storage medium such as a floppy disk or CD-R and sent to the user.

The license certificate numbers (IDs) are managed by a host computer possessed by a license issuer, using a database such as that shown in FIG. 36. That is, the license issuer produces the license certificate database shown in FIG. 36. The production of the database may be performed manually or using a proper tool. As shown in FIG. 36, license certificate numbers (IDs) are randomly determined and described in column 3601. Arbitrary numbers may be employed as the license certificate numbers as long as there are no duplicated numbers. License certificate status information indicating whether license certificates are already used by users (that is, whether license files have already been issued) is described in column 3602. Application IDs are described in column 3603. License information associated with application IDs (indicating days of validity, the number of times that applications are allowed to be performed) is described in columns 3604 to 3607. The license information is arbitrarily produced by the license issuer.

Figure 35:
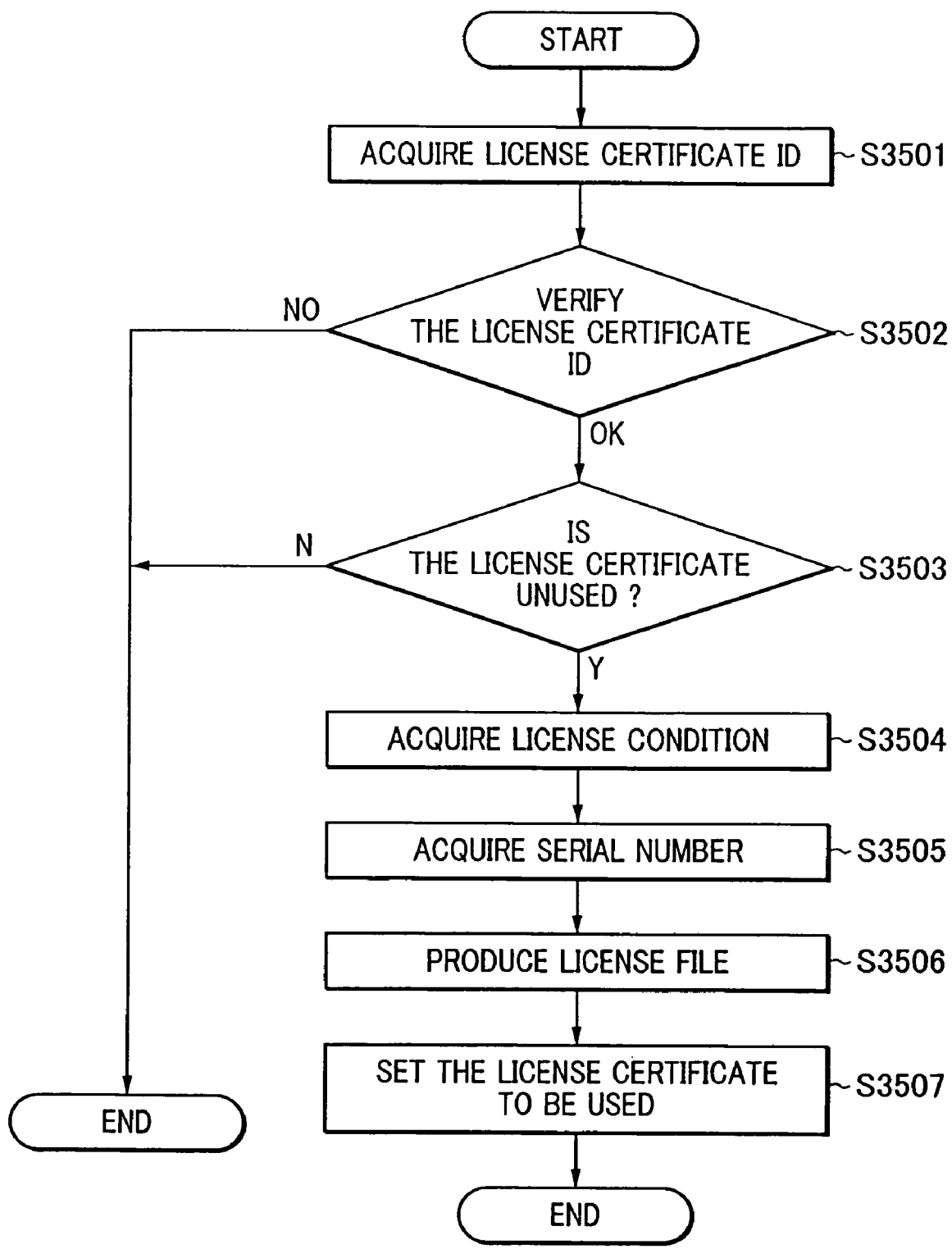
FIG. 35 is a flow chart showing a process of issuing a license file on the basis of information indicating a license certificate number.

FIG. 35 shows a process of issuing a license file on the basis of information received from a user of an application in terms of the license certificate number (ID) and the serial number of the device. This process shown in FIG. 35 is performed on a host computer (having a similar hardware configuration of that of the personal computer 2701, although not shown) having the license certificate database shown in FIG. 36. During this process, a license certificate number (ID) and a serial number of a device can be input via a windows-based or command line-based user interface.

First, in step S3501, an input license certificate number (ID) is acquired. In step S3502, the license certificate database (FIG. 36) is searched for the same license certificate number (ID) as the input license certificate number (ID). If the license certificate number (ID) is not found in the license certificate database, it is determined that the received license certificate number (ID) is invalid, and the process is terminated. If the license certificate number (ID) is found, the process proceeds to step S3503. In step S3503, it is further determined whether the license certificate is unused (that is, whether a corresponding license file has already been issued). The determination is performed by examining the license certificate status information (3602) corresponding to the license certificate number (ID), described in the license certificate database (shown in FIG. 36). If it turns out that the license has been used, the process is terminated.

If the license is unused, the process proceeds to step S3504. In step S3504, license information (indicating the days of validity (3604), the number of times that copying operation is allowed to be performed (3605), the number of times that printing operation is allowed to be performed (3606), and the number of times that scanning operation is allowed to be performed (3607)) corresponding to the license certificate number (ID) is extracted from the license certificate database. In the next step S3505, an input serial number of the device is acquired. In step S3506, a license file is produced on the basis of license information acquired via previous steps. The production of the license file is performed according to the flow shown in FIG. 21. The period of validity of installation of the license file is set to a fixed value (for example, one year). The resultant license file is written in the file system such that the license issuer can get the license file. Thereafter, in the license certificate database, the license certificate status (3602) corresponding to the license certificate number (ID) is rewritten to indicate that the license certificate is "used". Thereafter, the process is ended.

Preferably, a license file ID identifying the license file is produced, and the application ID identifying the program, the allowed amount of usage, the serial number serving as the device identification information, and the produced license file ID are incorporated into the license information by means of insertion, addition, or rewriting.

Thus, by building the license certificate database for managing license certificates, and distributing license certificates in the form of packages, it becomes possible to sell/purchase license files via the Internet in addition to direct selling/purchasing.

Another embodiment is described below in which licenses are dynamically downloaded into devices when applications are started and all licenses are managed in the centralized fashion. In the embodiment described above with reference to FIG. 32, the number of times that operation is allowed to be performed is described in a license file for all applications detected from the database, and the numbers of times that the applications are allowed to be performed are temporarily set to 0 in the database so that issuing of a license of the same applications to another device is disabled thereby disabling the usage of the applications. Alternatively, the maximum number of times that operation is allowed to be performed may be set to a predetermined value (for example, 100) and may be described in a license file. The maximum number is subtracted from the number of times of allowed operation described in the database, and the value described in the database may be temporarily replaced with the result of the subtraction.

Still alternatively, the maximum number of users who are allowed to use an application at the same time is set as license information for the application, and a license may be produced in accordance with the license information.

In this case, the process is performed as described below with reference to FIGS. 37 and 38.

Figure 37:
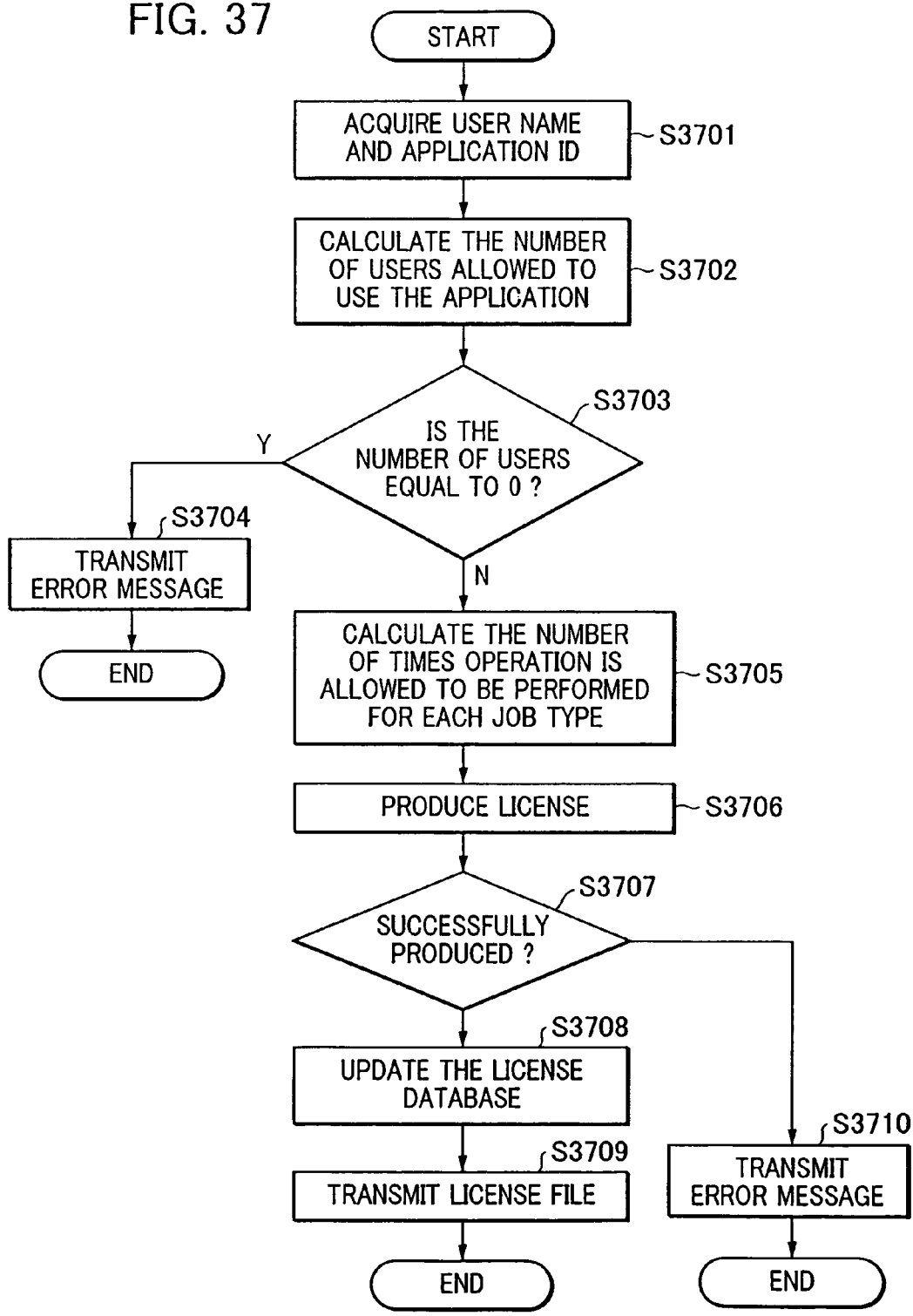
FIG. 37 is a flow chart showing a process of issuing a license, performed by a host device, in the automatic license distribution process, in which the number of users allowed to use applications is limited to a predetermined value.

FIG. 37 shows a process of issuing a license file in response to receiving a license file request command issued by a device in step S3001 in FIG. 30. This process shown in FIG. 32 is performed on the host computer 2701.

In step S3701, a serial number of the device that has issued the request in step S3001 in FIG. 30, a user name, and an application ID are extracted from parameters described in the license request command.

In step S3702, an application license database shown in FIG. 38 is searched to detect a record including the same application ID as the extracted application ID, and the number of additional users who can use the application is determined by calculating the difference between the maximum allowable number of users (3803) and the current number of users who are using the applications.

In step S3203, it is checked whether the number of additional users allowed to use the application is equal to 0. If it turns out that the number of additional users allowed to use the application is equal to 0, the process proceeds to step S3704. In step S3704, an error message is returned to the device that is the issuer of the license request command, and the process is terminated.

If the number of further users allowed to use the application is not equal to 0, the process proceeds to step S3705. In step S3705, the allowed number of times of operation of each job type is divided by the number of further users allowed to use the application.

In step S3706, a license file is produced on the basis of the quotient calculated in step S3705 and data described in the application license database shown in FIG. 34, in accordance with the flow shown in FIG. 21. In step S3707, it is determined whether the license file has been produced. When the allowed number of times of operation is set to 0 in the application license database, or when no record including the same application ID as the requested application ID is found in the database, a license file is not produced. In this case, the process proceeds to step S3710, and an error message is returned to the device that is the issuer of the license request command, and the process is terminated.

If the license file has been successfully produced, then, in step S3708, the application license database is updated by increasing the number of users currently using the application (3804) by 1 in the record corresponding to the application ID, and subtracting the values set in step S3706 in the license file so as to indicate the numbers of times that the application is allowed to be executed from the number of times (3805, 3806, and 3807).

Finally, in step S3709, the resultant license file is returned to the device that is the issuer of the license request command.

The process shown in FIG. 37 is performed in step S2809 in FIG. 28. A user ID, an application ID, and an increment in the right of usage described in a license file are detected and input in step S3701, and the process described above is started.

FIG. 38 shows an example of the application license database stored in the host computer 2701. License information associated with all applications executable in the network system shown in FIG. 27 is managed on this database in the centralized fashion. The database has a plurality of records in which application IDs are used as primary keys. Each record includes an application ID (3801), an expiration date of the application (3402), the maximum allowable number of users who are allowed to use the application (3803), the number of users who are currently using the application (3804), number of times that operations of applications are allowed to be performed (3405, 3406, and 3407), and an encryption key of the application (3408).

The maximum allowable number of users who are allowed to use the application (3803) is given by the MaxOfUsers attribute described in a license file (FIG. 20), and is set in the application database shown in FIG. 38 via the process, shown in FIG. 22, performed on the host computer 2701.

In the environment in which it is difficult to use the Internet, it is required to send a large amount of information necessary in producing a license file to a license issuer before acquiring the license file. In the present embodiment, information necessary in producing license files is described together with identifiers in the database thereby making it possible to easily inform the license issuer of necessary information without having to use a telephone or a letter. This makes it possible to obtain a license file in any environment.

Other Embodiments

The processes described above with reference to the drawings may be performed on an information processing apparatus or an image forming apparatus according to a program installed from the outside. In this case, information including the program according to the present invention may be supplied to information apparatuses or image forming apparatuses from a storage medium such as a CD-ROM, a flush memory, or a FD, or from an external storage medium via a network.

Furthermore, the aspects of the present invention may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the functions of embodiments of the invention and thus the storage medium storing the program code falls within the scope of the present invention. Specific examples of such a storage medium for storing the program code include a floppy disk, a hard disk, an optical disk, a magneto-optical disk, a DVD, a CD-ROM, a magnetic tape, a non-volatile memory card, a ROM, and an EEPROM.

Furthermore, the scope of the present invention includes not only such a system in which the functions of any embodiment described above is implemented simply by reading and executing a program code on a computer but also a system in which a part of or the whole of process instructed by the program code is performed using a OS (operating system) on the computer. Furthermore, the scope of the present invention also includes a system in which a program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

In the embodiments described above, a plurality of counters are prepared on the image forming apparatus, and unused counters are dynamically assigned to an application when the application is installed. When the application is uninstalled, the counters assigned to that application are released. This makes it possible to correctly manage the count information for each application that is dynamically added and deleted. This also makes it possible to correctly charge users for usage of applications on the image forming apparatus depending on the amount of usage and make payment to vendors of applications.

Count information may be managed separately for each program performed on the image forming apparatus thereby making it possible to easily manage the amount of usage of each program.

When a program executed on the image forming apparatus is deleted, an associated counter may be released. This prevents an unnecessary increase in the number of counters. Furthermore, it becomes possible to easily manage the amount of usage of each program that is actually being used on the image forming apparatus.

When attribute information associated with a program executed on the image forming apparatus is added, an associated counter is released. Counters are properly assigned to programs and managed using a table. This makes it possible to acquire, display, and manage the accurate amounts of usage of programs being currently used on the image forming apparatus.

The amount of usage may be managed for each function of the image forming apparatus used by each program. This makes it possible to impose a charge for use of applications and functions provided by the image forming apparatus, depending on the value created by a combination of an application and a function.

As described above in detail, the present invention provides a technique of allowing only an owner of a right of usage of applications or functions of a peripheral device to issue license information.

A right of usage an application can be transferred from a device to another device when a failure occurs in the device or when transfer is desired for any other reason. This makes it possible to deal with right-of-usage information as valuables. It is also possible to return a right of usage of an application to an owner of the application because of termination of usage of the application after installing the right of usage on a device.

Furthermore, the present invention provides a technique of taking back, from a peripheral device, license information that defines the number of times that an application is allowed to be performed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A printing apparatus comprising:
a printing unit constructed to execute a printing process;
an acquisition unit constructed to acquire, via a network, license information that gives a user authority to use a program executable on the printing apparatus and indicates an amount of allowed usage of the program, together with device identification information identifying an apparatus;
a recognition unit constructed to recognize whether the acquired device identification information corresponds to device identification information of the printing apparatus;
an installation unit constructed to, if the recognition unit recognizes that the acquired device identification information corresponds to the device identification information of the printing apparatus, install the acquired license information to use the program, wherein the installation unit does not install the acquired license information if the recognition unit recognizes that the acquired device identification information does not correspond to the device identification information of the printing apparatus;
a control unit constructed to control usage of the program according to the installed license information by using a counter for counting a number of usages of the program;
a production unit constructed to produce transfer license information for transferring the installed license information corresponding to the program to another printing apparatus; and
a transmission unit constructed to transmit the transfer license information produced by production unit to the other printing apparatus via the network.

2. The printing apparatus according to claim 1, wherein the acquired license information is encrypted using an encryption key uniquely assigned to the printing apparatus; and
the printing apparatus further comprises a decryption unit constructed to decrypt the encrypted license information.

3. The printing apparatus according to claim 1, wherein the transmission unit encrypts the transfer license information and transmits the encrypted the transfer license information to the other printing apparatus.

4. The printing apparatus according to claim 1, wherein the production unit produces the transfer license information by using a remaining number of allowed usages of the program according to the installed license information.

5. The printing apparatus according to claim 1, wherein, when the transfer license information is produced, the installed license information is invalidated in the printing apparatus.

6. A license information management method implemented by a printing apparatus, comprising;
a processor of the printing apparatus performing the steps of:
a printing step of executing a printing process;
an acquisition step of acquiring, via a network, license information that gives a user authority to use a program executable on the printing apparatus and indicates an amount of allowed usage of the program, together with device identification information identifying an apparatus;
a recognition step of recognizing whether the acquired device identification information corresponds to device identification information of the printing apparatus;
an installation step of, if the recognition step recognizes that the acquired device identification information corresponds to the device identification information of the printing apparatus, installing the acquired license information to use the program, and if the recognition step recognizes that the acquired device identification information does not correspond to the device identification information of the printing apparatus, not installing the acquired license information;
a control step of controlling usage of the program according to the installed license information by using a counter for counting a number of usages of the program;
a production step of producing transfer license information for transferring the installed license information corresponding to the program to another printing apparatus; and
a transmission step of transmitting the transfer license information produced by the production step to the other printing apparatus via the network.

7. The method according to claim 6, wherein
the acquired license information is encrypted using an encryption key uniquely assigned to the printing apparatus; and
the method further comprises a step of decrypting the encrypted license information.

8. The method according to claim 6, wherein the transmission step encrypts the transfer license information and transmits the encrypted the transfer license information to the other printing apparatus.

9. The method according to claim 6, wherein the production step produces the transfer license information by using a remaining number of allowed usages of the program according to the installed license information.

10. The method according to claim 6, wherein, when the transfer license information is produced, the installed license information is invalidated in the printing apparatus.

11. A computer-readable storage medium including a control program stored thereon for being executed by a processor of printing apparatus to manage license information, the control program comprising the steps of:

a printing step of executing a printing process;

an acquisition step of acquiring, via a network, license information that gives a user authority to use a program executable on the printing apparatus and indicates an amount of allowed usage of the program, together with device identification information identifying an apparatus;

a recognition step of recognizing whether the acquired device identification information corresponds to device identification information of the printing apparatus;

an installation step of, if the recognition step recognizes that the acquired device identification information corresponds to the device identification information of the printing apparatus, installing the license information to use the program and if the recognition step recognizes that the acquired device identification information does not correspond to the device identification information of the printing apparatus, not installing the acquired license information;

a control step of controlling usage of the program according to the installed license information by using a counter for counting a number of usages of the program;

a production step of producing transfer license information for transferring the installed license information corresponding to the program to another printing apparatus; and a transmission step of transmitting the transfer license information produced by the production step to the other printing apparatus via the network.

* * * * *